(12) United States Patent
Norimatsu et al.

(10) Patent No.: US 7,942,584 B2
(45) Date of Patent: May 17, 2011

(54) WHEEL BEARING APPARATUS

(75) Inventors: Takayuki Norimatsu, Iwata (JP); Kenrou Adachi, Iwata (JP); Isao Hirai, Iwata (JP)

(73) Assignee: NTN Corporation (JP)

( * ) Notice: Subject to any disclaimer, the term of this patent is extended or adjusted under 35 U.S.C. 154(b) by 518 days.

(21) Appl. No.: 11/542,560

(22) Filed: Oct. 3, 2006

(65) Prior Publication Data

US 2007/0081751 A1    Apr. 12, 2007

(30) Foreign Application Priority Data

| Oct. 4, 2005 | (JP) | 2005-291305 |
| Oct. 4, 2005 | (JP) | 2005-291500 |
| Jan. 12, 2006 | (JP) | 2006-004671 |
| Feb. 7, 2006 | (JP) | 2006-029301 |
| Feb. 7, 2006 | (JP) | 2006-029331 |

(51) Int. Cl.
*F16C 13/00* (2006.01)
*F16C 33/76* (2006.01)
*F16J 15/00* (2006.01)

(52) U.S. Cl. ........ 384/544; 384/484; 384/486; 277/349; 277/353; 277/549

(58) Field of Classification Search .......... 384/477–486, 384/544, 589; 277/349, 423, 562, 565, 566, 277/571, 346, 352, 353, 358, 549, 575–577
See application file for complete search history.

(56) References Cited

U.S. PATENT DOCUMENTS

| 4,434,985 | A |   | 3/1984 | Sonnerat |  |
| 5,813,675 | A | * | 9/1998 | Otto | 277/549 |
| 5,890,812 | A | * | 4/1999 | Marcello et al. | 384/148 |
| 5,975,534 | A | * | 11/1999 | Tajima et al. | 277/353 |
| 6,170,992 | B1 | * | 1/2001 | Angelo et al. | 384/477 |
| 6,354,598 | B1 | * | 3/2002 | Huang | 277/551 |
| 6,481,896 | B1 | * | 11/2002 | Ohtsuki et al. | 384/484 |
| 6,485,185 | B1 | * | 11/2002 | Conway et al. | 384/484 |
| 6,979,001 | B2 | * | 12/2005 | Ohtsuki et al. | 277/549 |
| 2002/0064325 | A1 | * | 5/2002 | Yeo | 384/484 |
| 2004/0086212 | A1 | * | 5/2004 | Ohtsuki et al. | 384/448 |
| 2004/0228556 | A1 | * | 11/2004 | Ohtsuki et al. | 384/448 |

FOREIGN PATENT DOCUMENTS

| EP | 0 065 887 | 4/1982 |
| JP | 2-93569 | 7/1990 |
| JP | 2-127859 | 10/1990 |
| JP | 05-099235 | 4/1993 |
| JP | 09-292032 | 11/1997 |
| JP | 2001-065704 | 3/2001 |
| JP | 2001-165179 | 6/2001 |
| JP | 2001-289254 | 10/2001 |
| JP | 2004-060751 | 2/2004 |
| JP | 2004-169761 | 6/2004 |
| JP | 2004-239353 | 8/2004 |

\* cited by examiner

*Primary Examiner* — James Pilkington
(74) *Attorney, Agent, or Firm* — Harness, Dickey & Pierce, P.L.C.

(57) ABSTRACT

A wheel bearing apparatus has an outer member, an inner member, double row rolling elements, and seals. At least one seal has a slinger and an annular sealing plate. The sealing plate has a metal core, press fit into the outer member, and a sealing member, integrally vulcanized adhered to the metal core. The sealing member has first and second side lips, formed with an inclination extending radially outward, and a cylindrical inner end portion, surrounding the inner circumferential edge and a portion of the back surface of the metal core. Each tip of the first and second side lips is in sliding contact with the slinger, with a predetermined interference. The cylindrical inner end portion is arranged opposite to the slinger with a slight radial gap therebetween to form a labyrinth seal.

8 Claims, 12 Drawing Sheets

(a)  (b)

(a)  (b)

US 7,942,584 B2

WHEEL BEARING APPARATUS

CROSS-REFERENCE TO RELATED APPLICATIONS

This application claims priority to Japanese Patent Application Nos. 2005-291305, filed Oct. 4, 2005; JP 2005-291500, filed Oct. 4, 2005; JP 2006-004671, filed on Jan. 12, 2006; JP 2006-029301, filed on Feb. 7, 2006; and JP 2006-029331, filed on Feb. 7, 2006. The disclosures of the above application are incorporated herein by reference.

FIELD

The present disclosure relates to a wheel bearing apparatus which rotatably supports a vehicle wheel such as an automobile, relative to a suspension apparatus and, more particularly, to a wheel bearing apparatus intended to increase the sealability of seals mounted on a bearing portion in order to reduce bearing torque.

BACKGROUND

Wheel bearing apparatus to support a vehicle wheel is an apparatus that rotatably supports a wheel mounting wheel hub, via double row rolling bearings, for a driving wheel and a driven wheel. In general, for structural reasons, a bearing of the inner ring rotation type is used for a driving wheel. Both inner ring rotation and outer ring rotation types are used for a driven wheel. In general, the wheel bearing apparatus is classified into a so-called first-generation type, where the wheel bearing includes double row angular ball bearings fitted between a knuckle and a wheel hub, a second-generation type, where the body mounting flange or the wheel mounting flange is directly formed on the outer circumferential surface of the outer member, a third generation type, where one of the inner raceway surfaces is formed directly on the outer circumferential surface of the wheel hub, and a fourth generation type, where an inner raceway surface is formed directly on the outer circumferential of an outer joint member of the wheel hub and a constant velocity universal joint, respectively.

In the bearing portion of these wheel bearing apparatus, seals are provided to prevent leakage of grease contained within the bearing as well as to prevent ingress of rain water or dust into the bearing. Recently, the automobile industry has trended toward maintenance-free bearings which require the bearings to have a longer life. From investigations into what causes damage to the bearings, it has been found that a substantial part of the damage is caused by troubles with the seal of bearing rather than a cause such as delamination of bearing surface. Accordingly, the life of the bearing apparatus can be improved by improving the sealability and durability of the bearing apparatus.

Various seals have been proposed for the wheel bearing apparatus to improved sealability. One representative example is shown in FIG. 17. This seal includes an annular sealing plate 53 and a sealing element 54. Each has an "L" shaped cross-section and is arranged opposite to one another. They are mounted on an inner member 51, such as an inner ring of the bearing, and an outer member 52, such as the outer ring of bearing in order to seal a space between the inner and outer members 51 and 52.

The sealing plate 53 includes a cylindrical portion 53a, press fit onto the outer circumferential surface of the inner member 51, a standing plate portion 53b, upstanding from the cylindrical portion 53a, and an inclined plate portion 53c, which extend from the tip of the standing plate portion 53b toward the inside of the seal. The sealing plate 53 functions as a slinger and is formed by press working of a steel sheet.

The sealing element 54 includes a steel base plate 55, with an "L" shaped cross-section and an elastomeric member 56, formed from rubber or synthetic resin. The sealing elements 54 is mounted on the outer member 52 by press fitting a cylindrical portion 55a of the base plate 55 onto the inner circumferential surface of the outer member 52. A standing plate portion 55b of the base plate 55 has an inclined portion 55c which extends from the tip of the standing plate portion 55b towards the inside of the seal. The elastomeric member 56 is arranged on the inside surface of the base plate 55 to cover it. The elastomeric member 56 has first and second side lips 56a and 56b and one radial lip 56c.

The first side lip 56a extends from the standing plate portion 55b of the base plate 55 and has a radially outward inclination. The first side lip tip slidingly contacts the inclined plate portion 53c of the sealing plate 53. The second side lip 56b extends from a position near the tip of the standing plate portion 55b and has a radially outward inclination. The radial lip 56c extends from the tip of the standing plate portion 55b and has a radially inward inclination opposite to the standing plate portion 53b of the sealing plate 53. The radial lip tip slidingly contacts the cylindrical portion 53a.

Muddy water or dust splashed on the seal is directed onto the outer surface of the first side lip 56a which slidably contacts the inner surface of the sealing plate 53. However, due to the inclined plate portion 53c, extending radially outward from the standing plate portion 53b of the sealing plate 53, a small space "S" is formed into which muddy water or dust can enter. Thus, reduction of the sealing performance of the first side lip 56a can be caused by the accumulation of foreign matter, such as mud or sands, contained in the muddy water.

If the inner member 51 is arranged at a rotational side, muddy water or foreign matter contained in the space "S" will be splashed out by centrifugal force. Thus, it is possible to obtain an action of rapid discharge of the foreign matter without reducing the sealing performance. Even though the muddy water or foreign matter would immigrate into the next space between the first and second side lips 56a and 56b, further immigration of the foreign matter, etc. will be prevented by the second side lip 56b. Furthermore, if the foreign matter etc. immigrates into the next adjacent space between the second side lip 56b and the radial lip 56c, further immigration of the foreign matter etc. into the bearing will be prevented by the radial lip 56c. The radial lip 56c also can prevent leakage of lubricating oil contained within the bearing. See, Reference Patent Document: Japanese Laid-open Patent Publication No. 292032/1997

Although such a prior art seal can perform triple action sealing by the first and second side lips 56a and 56b as well as the radial lip 56c to prevent immigration of muddy water or other foreign matters and obtain a high sealing performance, rotational torque is increased by the friction resistance caused by the triple seals 56a, 56b and 56c. Thus, fuel consumption will be increased. In addition, heat generation in the seal will reduce the durability of the seal and will cause adverse influence on the life of bearing.

SUMMARY

It is, therefore, an object of the present disclosure to provide a wheel bearing apparatus which has simultaneous high sealability and bearing torque reduction.

According to an object of the disclosure, a wheel bearing apparatus comprises an outer member formed with double row outer raceway surfaces on its inner circumferential surface. An inner member includes a wheel hub with an integrally formed wheel mounting flange at one end and a cylindrical portion axially extending from the wheel mounting flange. At least one inner ring is fit onto the cylindrical portion of the wheel hub. The inner ring is formed with double row inner raceway surfaces on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section. The slinger and sealing plate are arranged opposite to each other. The sealing plate comprises a metal core press fit into the outer member. A sealing member is integrally vulcanized and adhered to the metal core. The sealing member comprises first and second side lips. The first and second side lips have an inclination extending radially outward. A cylindrical inner end portion surrounds the inner circumferential edge and a portion of the back surface of the metal core. Each tip of the first and second side lips slidingly contacts the slinger with a predetermined interference. The cylindrical inner end portion is arranged opposite to the slinger with a slight radial gap to form a labyrinth seal therebetween.

At least an inner-side seal of the seals comprises a slinger and an annular sealing plate. Each has a substantially "L" shaped cross-section and is arranged opposite to each other. The sealing plate comprises a metal core press fit into the outer member. A sealing member is integrally vulcanized and adhered to the metal core. The sealing member comprises first and second side lips formed with an inclination extending radially outward. A cylindrical inner end portion or the sealing member surrounds the inner circumferential edge and a portion of the back surface of the metal core. Each tip of the first and second side lips is in sliding contacts with the slinger with a predetermined interference. The cylindrical inner end portion of the sealing member is arranged opposite to the slinger with a slight radial gap to form a labyrinth seal therebetween. Thus, it is possible to provide a wheel bearing apparatus that simultaneously has a high sealability and torque reduction of the bearing.

The slinger comprises a cylindrical portion press fit onto the inner member. A standing plate portion extends radially outward from the cylindrical portion. A stop portion is bent radially outward at the end of the cylindrical portion. The stop portion is arranged so that it radially overlaps the cylindrical inner end portion of the sealing member with a predetermined axial gap therebetween. Thus, it is possible to prevent separation of the slinger and the sealing plate during assembling stages of the bearing or transportation stage. Thus, it is possible to unite two members (i.e. slinger and sealing plate) and assemble them onto the bearing. This enables easy assembly of the seal to the bearing as well as it improves the assembling accuracy.

If the interference of the first side lip against the slinger is set so that it is larger than the interference of the second side lip, it is possible to suppress wear of the second side lip. Thus, this maintains high sealability for a long term by the second side lip if the first side lip is worn and its interference is reduced.

The sealing member is adhered to the metal core so that the sealing member extends to a portion of the back surface of the metal core from its front surface through its inner and outer circumferential edges. Thus, it is possible to improve the sealability in the fitting portion.

The slinger is formed by press forming an anticorrosion steel sheet. The durability of the seal is improved and thus it is possible to reduce its manufacturing cost.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, a standing plate portion, extending radially outward from the cylindrical portion, and an inclined portion, bent at a radially outward tip of the standing plate portion at a predetermined radially inward angle. The sealing plate comprises a metal core, press fit into the outer member, and a sealing member, integrally vulcanized adhered to the metal core. The sealing member comprises first and second side lips, formed with an inclination extending radially outward, a radial lip, slidingly contacting the radially outer surface of the inclined portion, and a cylindrical inner end portion, surrounding the inner circumferential edge and a portion of the back surface of the metal core. Each tip of the first and second side lips slidingly contacts the slinger with a predetermined interface. The cylindrical inner end portion is arranged opposite to the slinger with a slight radial gap to form a labyrinth seal therebetween.

At least an inner-side seal of the seals comprises a slinger and an annular sealing plate. Each has a substantially "L" shaped cross-section arranged opposite to one another. The slinger comprises a cylindrical portion, fit onto the outer member, a standing plate portion, extending radially outward from the cylindrical portion, and an inclined portion, bent at a radially outward tip of the standing plate portion at a predetermined radially inward angle. The sealing plate comprises a metal core press fit into the outer member. A sealing member is integrally vulcanized adhered to the metal core. The sealing member comprises first and second side lips, with an inclination extending radially outward, a radial lip, slidingly contacting the radially outer surface of the inclined portion, and a cylindrical inner end portion, surrounding the inner circumferential edge and a portion of the back surface of the metal core. Each tip of the first and second side lips slidingly contacts the slinger with a predetermined interface. The cylindrical inner end portion of the sealing member is arranged opposite to the slinger with a slight radial gap to form a labyrinth seal therebetween. Thus, it is possible to provide a wheel bearing apparatus which can suppress an increase of rotational torque of the seal and ensure high sealability. Accordingly, this improves the durability of the seal and the wheel bearing.

If the inclined portion of the slinger is inclined in a range of 30°~45° relative to the standing plate portion, it is possible to obtain a pertinent contacting force without making a strict positioning accuracy relative to the radial lip and to reduce the rotational torque by suppressing increase of the frictional resistance.

Also if, the interference of the first side lip against the slinger is set so that it is larger than that of the second side lip, it is possible to suppress wear of the second side lip and thus to maintain high sealability for a long term by the second side lip if the first side lip is worn and its interference is reduced.

If the sealing member is adhered to the metal core so that the sealing member extends to a portion of the back surface of the metal core from its front surface through its inner and outer circumferential edges, it is possible to improve the sealability in the fitting portion.

A stop portion, bent radially outward, is formed at the end of the cylindrical portion of the slinger. The stop portion is arranged so that it radially overlaps the cylindrical inner end portion of the sealing member with a predetermined axial gap. Thus, it is possible to prevent separation of the slinger and the sealing plate during the assembling stage to the bearing or the transportation stage. Thus, it is possible to unite the two members (i.e. slinger and sealing plate) as a unit and assemble it onto the bearing. This enables easy assembly of the seal onto the bearing as well as improving assembling accuracy.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with double row inner raceway surfaces on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips in sliding contact with the standing plate portion of the slinger with a predetermined interference. A grease lip is arranged so as not to contact the cylindrical portion of the slinger.

At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips, in sliding contact with the standing plate portion of the slinger with a predetermined interference, and a grease lip, arranged so as not to contact the cylindrical portion of the slinger. Thus, it is possible to provide a wheel bearing apparatus that maintains the sealability of the seal and further reduces the rotational torque of the bearing.

If the grease lip of the sealing plate and the cylindrical portion of the slinger can be kept in a contacting condition with each other, before the seal is mounted between the outer and inner members, it is possible to prevent separation of the slinger and the sealing plate during the assembly stage or transportation stage of the bearing. Thus, it is possible to unite two members (i.e. slinger and sealing plate) as a unit and assemble it onto to the bearing. This enables easy assembly of the seal onto the bearing as well as it improves assembling accuracy.

If the cylindrical portion of the slinger and the grease lip are arranged in a mutually opposed condition with a slight gap to form a labyrinth seal therebetween, it is possible to suppress wear of the grease lip. Thus, this further improves the sealability of the bearing.

The sealing plate comprises a metal core press fit into the outer member and a sealing member integrally vulcanized adhered to the metal core. The sealing member is formed with a plurality of side lips and a grease lip. Thus, it is possible to further effectively improve the sealability at the fitting portion.

The slinger is formed by press forming an anticorrosion steel sheet to improve the durability of seal. Thus, it is possible to reduce the manufacturing cost of the bearing.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips. Each tip of each lip is in sliding contact with the standing plate portion of the slinger with a predetermined contacting load. A grease lip has a tip in sliding contact with the cylindrical portion of the slinger with a predetermined frictional force. The frictional force of the grease lip is equal to or larger than the contacting load of the plurality of side lips at least before mounting the seal between the outer and inner members.

At least an inner-side seal of the seals comprises a slinger and an annular sealing plate. Each has a substantially "L" shaped cross-section and is arranged opposite to one another. The slinger comprises a cylindrical portion fit, onto the outer member, and a standing plate portion, extending radially outward from the cylindrical portion. The sealing plate comprises a plurality of side lips. Each tip of the lips is in sliding contact with the standing plate portion of the slinger, with a predetermined contacting load. A grease lip has a tip in sliding contact with the cylindrical portion of the slinger with a predetermined frictional force. The frictional force of the grease lip is equal to or larger than the contacting load of the plurality of side lips at least before mounting of the seal between the outer and inner members. Thus, it is possible to provide a wheel bearing apparatus which can maintain sealability of the seal and improve assembly efficiency of the seal onto the bearing.

The frictional force of the grease lip relative to the cylindrical portion of the slinger is set to be 12 N. The contacting load of the plurality of side lips relative to the standing plate of the slinger is set to be 8 N. Thus, it is possible to prevent separation of the slinger and the sealing plate during the assembly stage to the bearing or during the transportation stage. Thus, it is possible to unite two members (i.e. slinger and sealing plate) as a unit and assemble it onto the bearing. This enables easy assembly of the seal onto the bearing as well as to improve assembly accuracy.

The sealing plate comprises a metal core press fit into the outer member. A sealing member is integrally vulcanized adhered to the metal core. The sealing member is formed with a plurality of side lips and a grease lip. Thus, it is possible to further effectively improve the sealability at the fitting portion.

If the sealing plate is formed with two side lips and one grease lip, it is possible to further effectively improve the sealability at the fitting portion.

If the slinger is formed by press forming an anticorrosion steel sheet, the durability of seal is improved and it is possible to reduce its manufacturing cost.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips in sliding contact with the standing plate portion of the slinger with a predetermined interference, and a grease lip, arranged so as not to contact the cylindrical portion of the slinger. The cylindrical portion of the slinger is formed with a bent portion projecting radially outward. The outer diameter of the bent portion is set larger than the inner diameter of the radially innermost side lip.

At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips, in sliding contact with the standing plate portion of the slinger with a predetermined interference, and a grease lip, arranged so as not to contact the cylindrical portion of the slinger. The cylindrical portion of the slinger is formed with a bent portion projecting radially outward. The outer diameter of the bent portion is set larger than the inner diameter of the radially innermost side lip. Thus, it is possible to provide a wheel bearing apparatus which can keep the sealability of the seal, reduce rotational torque of the bearing, and improve assembly efficiency of the seal onto the bearing.

If the labyrinth seal is formed between the tip of the grease lip and the inner ring and between the grease lip and the tip of slinger, it is possible to suppress wear of the grease lip and to further improved sealability.

If the labyrinth seal is formed between the tip of the grease lip and the cylindrical portion of the slinger and between the grease lip and the bent portion of the slinger, it is possible to suppress wear of the grease lip and to further improve sealability.

The sealing plate comprises a metal core press fit into the outer member. A sealing member is integrally vulcanized adhered to the metal core. The sealing member is formed with a plurality of side lips and a grease lip. Thus, it is possible to further effectively improve the sealability at the fitting portion.

If the slinger is formed by press forming an anticorrosion steel sheet, the durability of seal is improved and it is possible to reduce manufacturing cost.

An outer member is formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The sealing plate comprises a metal core press fit into the outer member. A sealing member is integrally vulcanized adhered to the metal core. The sealing member comprises first and second side lips formed with an extending radially outward inclination. A cylindrical inner end portion surrounds the inner circumferential edge and a portion of the back surface of the metal core. Each tip of the first and second side lips slidingly contacts the slinger with a predetermined interference. The cylindrical inner end portion of the sealing member is arranged opposite to the slinger with a slight radial gap to form a labyrinth seal therebetween. Thus, it is possible to provide a wheel bearing having simultaneous high sealability and torque reduction of the bearing.

An outer member is formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, a standing plate portion, extending radially outward from the cylindrical portion, and an inclined portion, bent at a radially outward tip of the standing plate portion a predetermined radially inward angle. The sealing plate comprises a metal core press fit into the outer member. A sealing member is integrally vulcanized adhered to the metal core. The sealing member comprises first and second side lips formed with an extending radially outward inclination. A radial lip slidingly contacts the radially outer surface of the inclined portion. A cylindrical inner end portion surrounds the inner circumferential edge and a portion of the back surface of the metal core. Each tip of the first and second side lips slidingly contacts the slinger with a predetermined interface. The cylindrical inner end portion is arranged opposite to the slinger with a slight radial gap to form a labyrinth seal therebetween. Thus, it is possible to provide a wheel bearing apparatus which can suppress an increase of the rotational torque of the seal and ensure high sealability, thus improving the durability of the seal and the wheel bearing.

An outer member is formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips, in sliding contact with the standing plate portion of the slinger with a predetermined interference, and a grease lip, arranged so as not to contact the cylindrical portion of the slinger. Thus, it is possible to provide a wheel bearing apparatus that maintains the sealability of the seal and further reduces the rotational torque of the bearing.

An outer member with double row outer raceway surfaces is formed on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips, each tip is in sliding contact with the standing plate portion of the slinger with a predetermined contacting load, and a grease lip, with a tip in sliding contact with the cylindrical portion of the slinger with a predetermined frictional force. The frictional force of the grease lip is equal to or larger than the contacting load of the plurality of side lips at least before mounting of the seal between the outer and inner members. Thus, it is possible to provide a wheel bearing apparatus which maintains the sealability of the seal and improves the assembly efficiency of the seal to the bearing.

An outer member is formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips, which slidingly contact the standing plate portion of the slinger with a predetermined interference, and a grease lip, arranged so as not to contact the cylindrical portion of the slinger. The cylindrical portion of the slinger is formed as a projecting radially outwardly bent portion. The outer diameter of the bent portion is set larger than the inner diameter of the radially innermost side lip. Thus, it is possible to provide a wheel bearing apparatus which maintains sealability of the seal, reduces rotational torque of the bearing, and improves assembly efficiency of the seal onto the bearing.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row outer raceway surfaces are arranged opposite to the double row raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The sealing plate comprises a metal core, press fit into the outer member, and a sealing member, integrally vulcanized adhered to the metal core. The sealing member comprises first and second side lips, formed on an radially outward extending inclination, and a cylindrical inner end portion, surrounding the inner circumferential edge and a portion of the back surface of the metal core. Each tip of the first and second side lips sliding contacts the slinger with a predetermined interference. The cylindrical inner end portion is arranged opposite to the slinger with a slight radial gap to form a labyrinth seal therebetween. A stop portion, bent radially outward, is formed at the end of the slinger. The stop portion is arranged so that it radially overlaps the inner end portion of the sealing member with a predetermined axial gap therebetween.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with double inner raceway surfaces on its outer circumferential surface. The double row inner raceway surfaces are arranged opposite to the double row outer raceway surfaces.

Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, a standing plate portion, extending radially outward from the cylindrical portion, and an inclined portion, bent at a radially outward tip of the standing plate portion at a radially inward angle of 30°~45°. The sealing plate comprises a metal core, press fit into the outer member, and a sealing member, integrally vulcanized adhered to the metal core. The sealing member comprises first and second side lips, formed with radially outward extending inclination, a radial lip, slidingly contacting the radially outer surface of the inclined portion, and a cylindrical inner end portion, which surrounds the inner circumferential edge and a portion of the back surface of the metal core. Each tip of the first and second side lips is in sliding contact with the slinger with a predetermined interface. The cylindrical inner end portion is arranged opposite to the slinger with a slight radial gap to form a labyrinth seal therebetween.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips, slidingly contacting the standing plate portion of the slinger with a predetermined interference, and a grease lip, arranged so as not to contact the cylindrical portion of the slinger. The grease lip of the sealing plate and the cylindrical portion of the slinger can be kept in a contact condition with each other before the seal is mounted between the outer and inner members.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row inner raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips, with each tip in sliding contact with the standing plate portion of the slinger with a predetermined contacting load, and a grease lip, with a tip in sliding contact with the cylindrical portion of the slinger with a predetermined frictional force. The frictional force of the grease lip is equal to or larger than the contacting load of the plurality of side lips at least before mounting of the seal between the outer and inner members. The frictional force of the grease lip relative to the cylindrical portion of the slinger is set to be 12 N. The contacting load of the plurality of side lips relative to the standing plate of the slinger is set to be 8 N.

A wheel bearing apparatus comprises an outer member formed with double row outer raceway surfaces on its inner circumferential surface. An inner member includes a wheel hub integrally formed with a wheel mounting flange at one end and a cylindrical portion axially extending from the wheel mounting flange. At least one inner ring is fit onto the cylindrical portion of the wheel hub. The inner ring is formed with a double row outer raceway surface on its outer circumferential surface. The double row inner raceway surfaces are arranged opposite to the double row outer raceway surfaces. Double row rolling elements are rollably arranged between the outer and inner raceway surfaces, via cages. Seals are mounted in annular spaces formed between the outer member and the inner member. At least an inner-side seal of the seals comprises a slinger and an annular sealing plate. Each has a substantially "L" shaped cross-section and is arranged opposite to one another. The slinger comprises a cylindrical portion, fit onto the outer member, and a standing plate portion, extending radially outward from the cylindrical portion. The sealing plate comprises a plurality of side lips, slidingly contacting the standing plate portion of the slinger with a predetermined interference, and a grease lip, arranged so as not to contact the cylindrical portion of the slinger. The cylindrical portion of the slinger is formed with a radially outwardly projecting bent portion. The outer diameter of the bent portion is set larger than the inner diameter of the radially innermost side lip.

Further areas of applicability will become apparent from the description provided herein. It should be understood that the description and specific examples are intended for purposes of illustration only and are not intended to limit the scope of the present disclosure.

DRAWINGS

Additional advantages and features of the present invention will become apparent from the subsequent description and the appended claims, taken in conjunction with the accompanying drawings, wherein:

DETAILED DESCRIPTION

Preferred embodiments will be described with reference to accompanied drawings.

Figure 1:
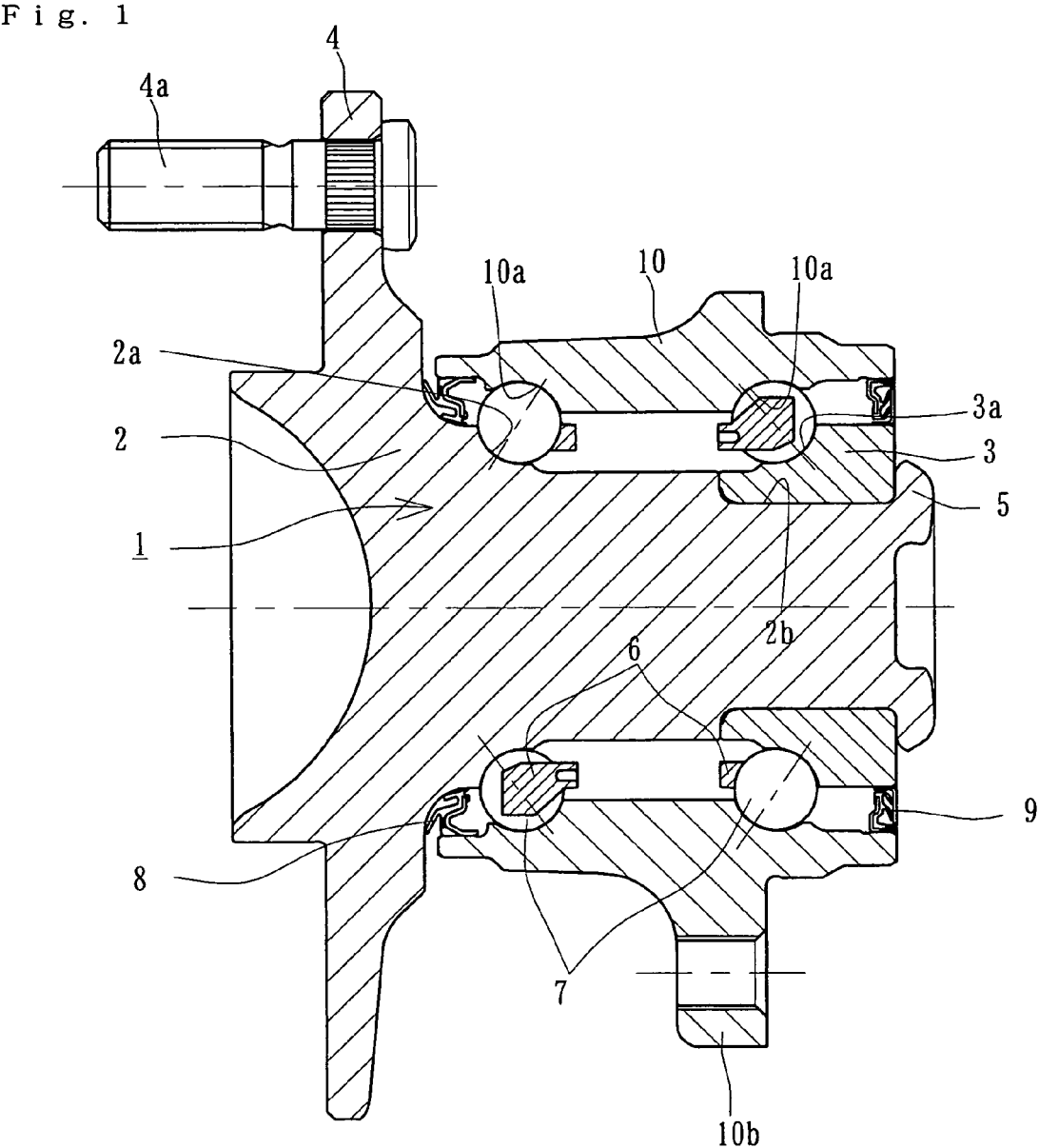
FIG. 1 is a longitudinal-section view of a wheel bearing apparatus of a first embodiment.
Figure 2:
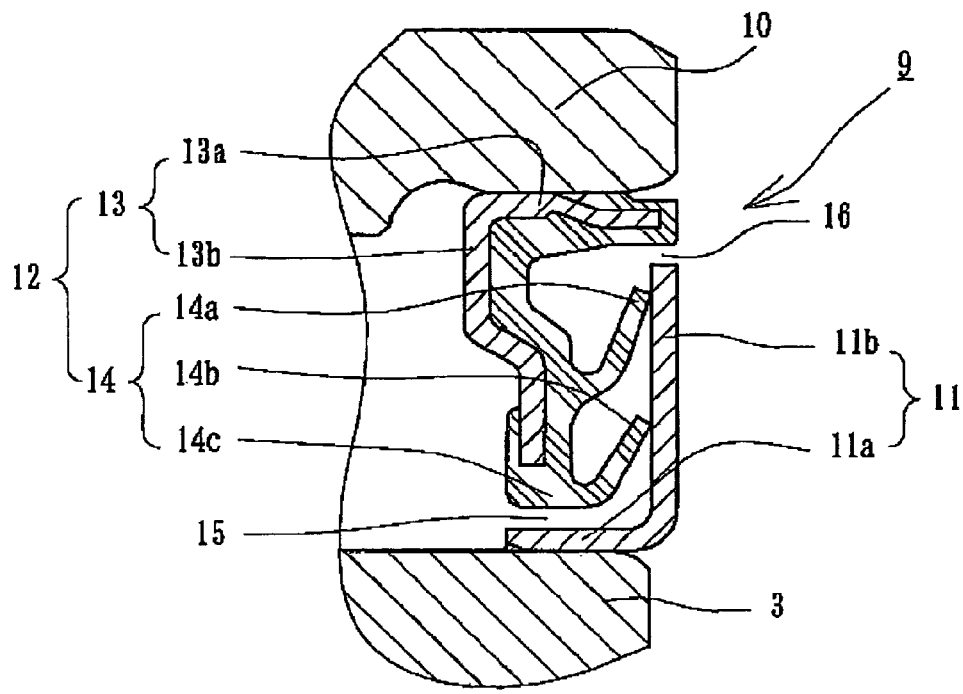
FIG. 2 is a partially enlarged sectional view of the inner-side seal of FIG. 1.
Figure 3:
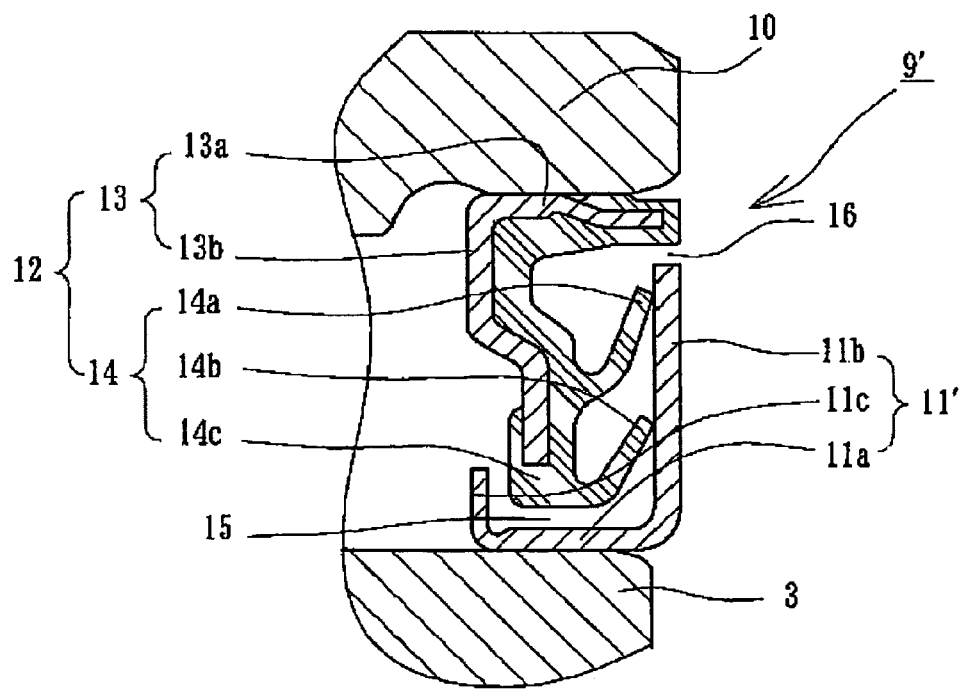
FIG. 3 is a partially enlarged sectional view of a modified embodiment of the seal of FIG. 2.

FIG. 1 is a longitudinal-section view of a first embodiment of a wheel bearing apparatus. FIG. 2 is a partially enlarged sectional view of a seal of FIG. 1. FIG. 3 is a partially enlarged sectional view of a modified embodiment of the seal of FIG. 2. In the description below, the term "outer-side" of the wheel bearing apparatus denotes a side which is positioned outside (left side in drawings) of the vehicle body. The term "inner-side" of the wheel bearing apparatus denotes a side which is positioned inside (right side in drawings) of the vehicle body when the wheel bearing apparatus is mounted on the vehicle body.

The wheel bearing apparatus of FIG. 1 is used for a driven wheel and is a so-called "third generation" structure. The apparatus includes inner and outer members 1 and 10, and double row rolling elements (balls) 7 and 7 rollably contained between the inner and outer members 1 and 10. The inner member 1 includes a wheel hub 2 and an inner ring 3 press fit onto the wheel hub 2, via a predetermined interference.

The wheel hub 2 is integrally formed with a wheel mounting flange 4. The wheel hub 2 has, on its outer circumference, one outer-side inner raceway surface 2a of the inner raceway surfaces 2a and 3a and a cylindrical portion 2b axially extending from the inner raceway surface 2a. Hub bolts 4a are mounted equidistantly along the periphery of the wheel mounting flange 4. The inner ring 3 is formed, on its outer circumference, with the other inner-side inner raceway surface 3a and is press fit onto the cylindrical portion 2b via a predetermined interference. The inner ring 3 is immovable secured in the axial direction relative to the wheel hub 2 in a pre-stressed condition by a caulked portion 5. The caulked portion 5 is formed by plastically deforming the end of the cylindrical portion 2b.

The outer member 10 is integrally formed with a body mounting flange 10b on its outer circumference. The body mounting flange 10b is to be mounted on a knuckle (not shown) to form a portion of a suspension apparatus. The outer member is formed with double row outer raceway surfaces 10a, 10a on its inner circumference. The double row outer raceway surfaces 10a and 10a are arranged opposite to the inner raceway surfaces 2a and 3a of the inner member 1. The double row rolling elements 7 and 7 are rollably contained between the inner raceway surfaces 2a and 3a and outer raceway surfaces 10a and 10a.

The outer member 10 is made of medium carbon steel such as S53C including carbon of 0.40~0.80% by weight. At least the double row outer raceway surfaces 10a and 10a are hardened to have a surface hardness of 58~64 HRC, by high frequency induction hardening.

Seals 8 and 9 are arranged at either ends of the outer member 10 in seal openings or annular spaces formed between the inner and outer members 1 and 10. The seals 8 and 9 prevent leakage of lubricating grease contained within the bearing and immigration of rain water or dust into the bearing.

The wheel hub 2 is made of medium carbon steel such as S53C including carbon of 0.40~0.80% by weight. The wheel hub 2 is formed with a hardened layer, by high frequency induction hardening, to have a surface hardness of 58~64 HRC from the base of the wheel mounting flange 4, which forms a seal land portion for an outer-side seal 8, to the cylindrical portion 2b. The caulked portion 5 is not hardened and remained as is after it is forged. The inner ring 3 is made of high carbon chrome bearing steel such as SUJ2. The inner ring 3 is hardened to its core by dip hardening to have a surface hardness of 58~64 HRC.

As shown in an enlarged view of FIG. 2, the inner-side seal 9 of the seals 8 and 9 includes a slinger 11 and an annular sealing plate 12. The slinger 11 is made by press forming austenitic stainless steel sheet (JIS SUS 304 etc.) or preserved cold rolled sheet (JIS SPCC etc.). The slinger 11 has a cross-section with a substantially "L" shaped configuration. A cylindrical portion 11a of the slinger 11 is fit into the inner ring 3. A standing plate portion 11b of the slinger 11 extends radially outward from the cylindrical portion 11a. Accordingly, it is possible to prevent the generation of corrosion in the slinger 11. Thus, this improves the durability of the seal 9 and reduces the manufacturing costs.

The sealing plate 12 has a substantially "L" shaped cross-section and is mounted on the outer member 10. The sealing plate 12 includes a metal core 13 and a sealing member 14 integrally adhered to the metal core 13 via vulcanized adhesion. The metal core 13 is made by press forming an austenitic stainless steel sheet (JIS SUS 304 etc.) or preserved cold rolled sheet (JIS SPCC etc.). The metal core 13 includes a cylindrical portion 13a, to be inserted into the end of the outer member 10, and a standing plate portion 13b, extending radially inward from the cylindrical portion 13a.

The sealing member 14 is made of synthetic rubber such as nitrile rubber. The sealing member 14 has first and second side lips 14a and 14b in sliding contact with the standing plate portion 11b of the slinger 11. The first and second side lips 14a and 14b are formed with an inclination that extends radially outward from the standing plate portion 13b of the metal core 13. The tips of the side lips 14a and 14b are adapted to contact with the standing plate portion 11b of the slinger, via predetermined interfaces.

The sealing member 14 is adhered to the metal core 13 so that it extends from the radially inner surface of the cylindrical portion 13a of the metal core 13 to its radially outer surface surrounding its radially outer circumferential edge to improve sealability between the metal core 13 and the outer member 10. The sealing member 14 also extends from the radially inner surface of the cylindrical portion 13a of the metal core 13 to the axially outer surface of the standing plate portion 13b of the metal core 13 surrounding its radially inner circumferential edge to form a cylindrical inner end portion 14c. A labyrinth seal 15 is formed by an annular gap between the cylindrical inner end portion 14c and the cylindrical portion 11a of the slinger 11. The labyrinth seal prevents leakage of lubricating grease contained within the bearing. In addition another labyrinth seal 16 is formed by an annular gap between the outer circumferential edge of the standing plate portion 11b of the slinger 11 and the metal core 13. The seal prevents the first and second side lips 14a and 14b from being directly splashed by rain water or dust from outside of the bearing.

As described above, the seal of this embodiment has the first and second side lips 14a and 14b in sliding contact with the standing plate portion 11b of the slinger 11. Also, the labyrinth seal 15 is formed between the cylindrical inner end portion 14c of the sealing member 14 and the cylindrical portion 11a of the slinger 11. In addition, the labyrinth seal 16 is formed between the outer circumferential edge of the standing plate portion 11b of the slinger 11 and the metal core 13. Thus, it is possible for the wheel bearing apparatus to provide both high sealability and low bearing torque.

In the first and second side lips 14a and 14b, the interference against the slinger 11 is set so that the first side lip 14a interference is larger than that of the second side lip 14b. Accordingly, it is possible to reduce wear of the second side lip 14b. Thus, this maintains high sealability for a long term if the first side lip 14a is abraded and its interference reduced.

FIG. 3 is a partially enlarged sectional view showing a modification of the seal shown in FIG. 2. This embodiment is different from the previous embodiment only in the structure of the slinger. Thus, the same reference numerals are used as those used in the previous embodiment to designate the same structural elements in this modified embodiment, except for the slinger.

This seal 9' includes a slinger 11' and the sealing plate 12 opposite to one another. The slinger 11' is made by press forming an austenitic stainless steel sheet (JIS SUS 304 etc.) or preserved cold rolled sheet (JISS SPCC etc.) to have a cross-section in a substantially "L" shaped configuration. A cylindrical portion 11a of the slinger is fit into the inner ring 3. A standing plate portion 11b of the slinger extends radially outward from the cylindrical portion 11a. A stop portion 11c is bent radially outward at the end of the cylindrical portion 11a.

The stop portion 11c can be formed by plastically deforming the end of the cylindrical portion 11a after a temporal assembly of the slinger 11' and the sealing plate 12. The stop portion 14c is arranged to radially overlap the inner end portion 14c of the sealing member 14, via an axial gap. Thus, it is possible to prevent separation of the slinger and the sealing plate during the assembly stage to the bearing or during the transportation stage. Thus, it is possible to unite two members, the slinger and the sealing plate as a unit, and assemble it onto the bearing. This enables an easy assembly of the seal onto the bearing as well as it improves assembling accuracy.

A second embodiment will be described with reference to the accompanying drawings where the same reference numerals as those used in the previous embodiment are used to designate the same structural elements as those used in the previous embodiment.

Figure 4:
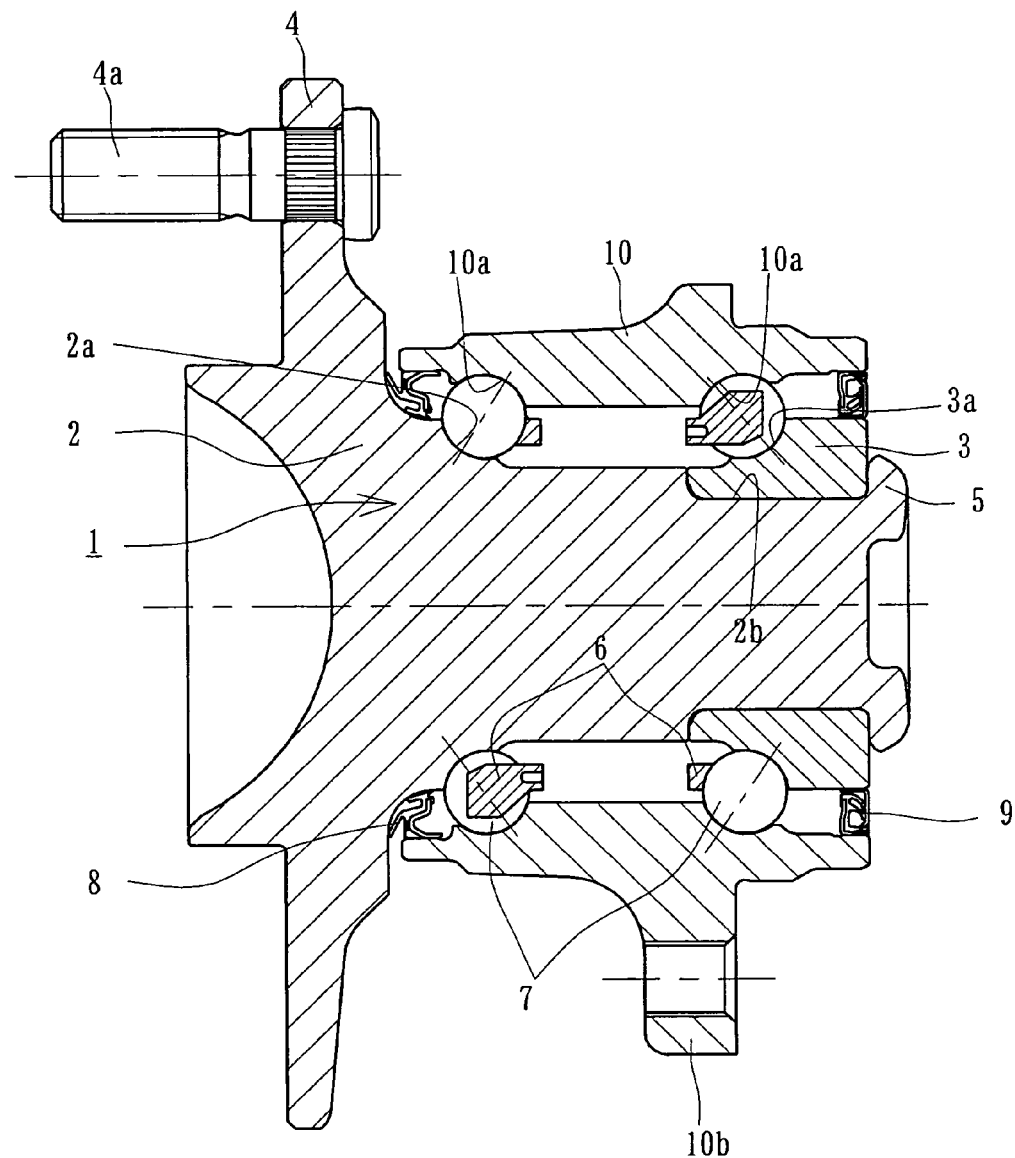
FIG. 4 is a longitudinal-section view of a wheel bearing apparatus of a second embodiment.

FIG. 4 is a longitudinal-section view of a wheel bearing apparatus of the second embodiment of the present invention.

Figure 5:
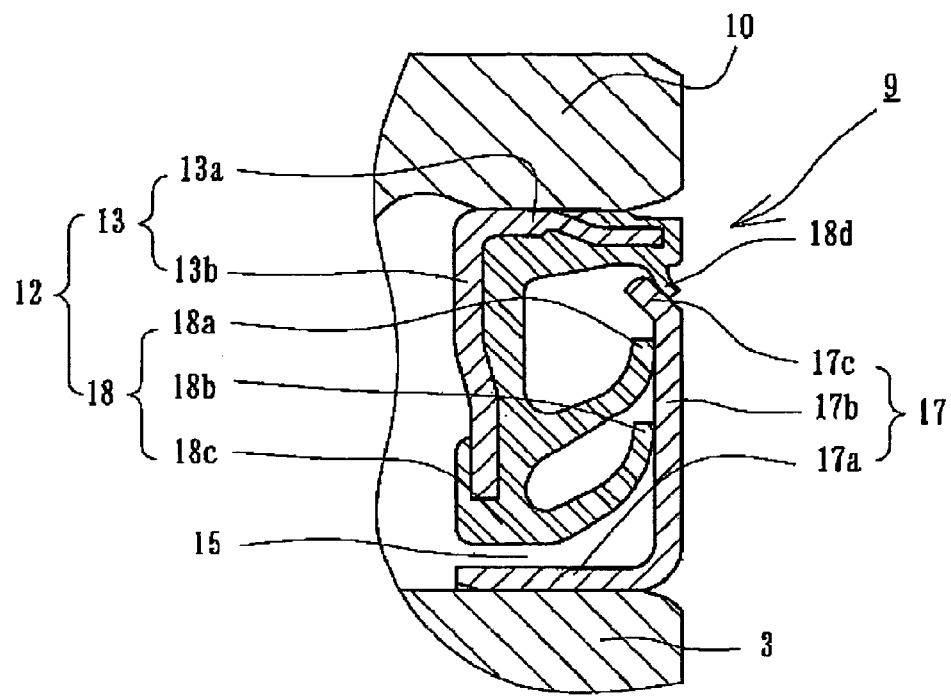
FIG. 5 is a partially enlarged sectional view of the inner-side seal of FIG. 4.
Figure 6:
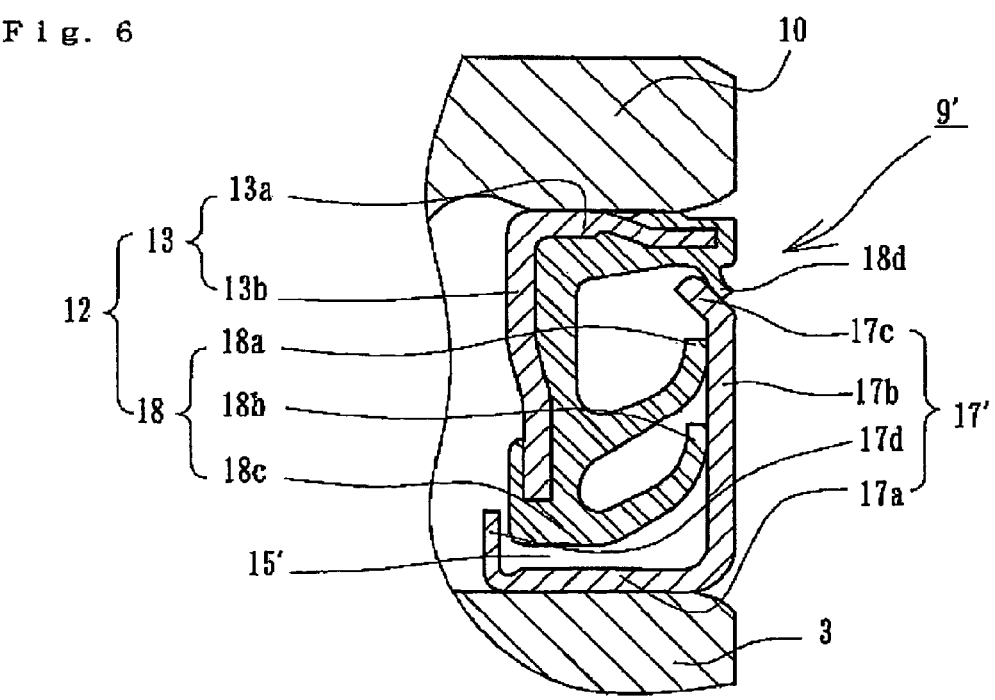
FIG. 6 is a partially enlarged sectional view of a modified embodiment of the seal of FIG. 5.

FIG. 5 is a partially enlarged sectional view of the inner-side seal of FIG. 4. FIG. 6 is a partially enlarged sectional view of a modified embodiment of the seal of FIG. 5. In the description below, the term "outer-side" of the wheel bearing apparatus denotes a side which is positioned outside, left side in drawings, of the vehicle body. The term "inner-side" of the wheel bearing apparatus denotes a side which is positioned inside, right side in drawings, of the vehicle body when the wheel bearing apparatus is mounted on the vehicle body.

The wheel bearing apparatus of FIG. 4 is used for a driven wheel and is a so-called "third generation" structure. The apparatus includes an inner and outer members 1 and 10 with double row rolling elements (balls) 7 and 7 rollably contained between the inner and outer members 1 and 10. The inner member 1 includes a wheel hub 2 and an inner ring 3 press fit onto the wheel hub 2, via a predetermined interference.

The wheel hub 2 is integrally formed with a wheel mounting flange 4. The wheel hub 2 has, on its outer circumference, one outer-side inner raceway surface 2a of the inner raceway surfaces 2a and 3a. A cylindrical portion 2b axially extends from the inner raceway surface 2a. Hub bolts 4a are mounted equidistantly about the periphery of the wheel mounting flange 4. The inner ring 3 is formed with the other inner-side inner raceway surface 3a on its outer circumference. The inner ring 3 is press fit onto the cylindrical portion 2b, via a predetermined interference. The inner ring 3 is immovable secured in the axial direction relative to the wheel hub 2 in a pre-stressed condition by a caulked portion 5, formed by plastically deforming the end of the cylindrical portion 2b.

The outer member 10 is integrally formed with a body mounting flange 10b on its outer circumference. The mounting flange 10b is mounted on a knuckle (not shown) forming a portion of a suspension apparatus. The outer member 10 has double row outer raceway surfaces 10a, 10a on its inner circumference. The double row outer raceway surfaces 10a and 10a are opposite to the inner raceway surfaces 2a and 3a of the inner member 1. The double row rolling elements 7 and 7 are rollably contained between the inner raceway surfaces 2a and 3a and outer raceway surfaces 10a and 10a.

The outer member 10 is made of medium carbon steel such as S53C including carbon of 0.40~0.80% by weight. At least the double row outer raceway surfaces 10a and 10a are hardened by high frequency induction hardening to have a surface hardness of 58~64 HRC.

Seals 8 and 9 are arranged at either ends of the outer member 10 in seal openings or annular spaces which are formed between the inner and outer members 1 and 10. These seals 8 and 9 prevent leakage of lubricating grease contained within the bearing and immigration of rain water or dust into the bearing.

The wheel hub 2 is made of medium carbon steel such as S53C including carbon of 0.40~0.80% by weight. The wheel hub 2 is formed with a hardened layer by high frequency induction hardening to have a surface hardness of 58~64 HRC from the base of the wheel mounting flange 4 which forms a seal land portion for an outer-side seal 8, to the cylindrical portion 2b. The caulked portion 5 is not hardened and remained as is after forging. The inner ring 3 is made of high carbon chrome bearing steel such as SUJ2 and is hardened to its core by dip hardening to have a hardness of 58~64 HRC.

As shown in an enlarged view of FIG. 5, the inner-side seal 9 of the seals 8 and 9 includes a slinger 17 and an annular sealing plate 12. The slinger 17 is made by press forming an austenitic stainless steel sheet (JIS SUS 304 etc.) or preserved cold rolled sheet (JIS SPCC etc.) to have a cross-section with a substantially "L" shaped configuration. The slinger has a cylindrical portion 17a, fit into the inner ring 3, a standing plate portion 17b, extending radially outward from the cylindrical portion 17a, and an inclined portion 17c, bent at a tip of the standing plate portion 17b at a predetermined inward angle.

The sealing plate 12 includes the metal core 13 and the sealing member 18 vulcanized adhered to the metal core 13. The sealing plate 12 has a substantially "L" shaped cross-section and is mounted on the outer member 10. The metal core 13 is made by press forming an austenitic stainless steel sheet (JIS SUS 304 etc.) or preserved cold rolled sheet (JIS SPCC etc.). The metal core 13 includes a cylindrical portion 13a, to be inserted into the end of the outer member 10, and a standing plate portion 13b, extending radially inward from the cylindrical portion 13a.

The sealing member 18 is made of synthetic rubber such as nitrile rubber. The sealing member 18 has first and second side lips 18a and 18b in sliding contact with the standing plate portion 17b of the slinger 17. The first and second side lips 18a and 18b are formed with an inclination extending radially outward from the standing plate portion 13b of the metal core 13. The tips of the side lips 18a and 18b are adapted to contact the standing plate portion 17b of the slinger 17, via predetermined interfaces. The sealing member 18 extends from the radially inner surface of the cylindrical portion 13a of the metal core 13 to a portion of its radially outer surface surrounding the circumferential edge of the cylindrical portion 13a. The sealing member 18 is formed with a radial lip 18d in sliding contact with the radially outer surface of the inclined portion 17c. This makes it possible to prevent separation of the slinger 17 and the sealing plate 12 during the assembly stage or the transportation stage of the bearing.

The assembly of the seal 9 to the bearing is carried out after having previously assembled the slinger 17 and the sealing plate 12 as a unit. In this pre-assemble step, since the inclined portion 17c of the slinger is passed through the radial lip 18d by elastically deforming it, the inclination angle of the inclined portion 17c is set at less than 45°, preferably 30°~45°. This is due to the fact that if the inclination angle is less than 30°, it will be difficult to obtain a pertinent contacting force (frictional force) without strictly limiting the positioning accuracy relative to the radial lip 18d. On the other hand, if the contacting resistance, frictional resistance, of the radial lip 18d, a radial component of the reaction force at the contacting point of lip, is increased this increases rotational torque and generation of heat in the seal.

As described above, the seal of this embodiment has the first and second side lips 18a and 18b in sliding contact with the standing plate portion 17b of the slinger 17. Also, the labyrinth seal 15 is formed between the cylindrical inner end portion 18c of the sealing member 18 and the cylindrical portion 17a of the slinger 17. In addition, the radial lip 18d is in sliding contact with the inclined portion 17c of the slinger 17. Thus, it is possible to prevent the side lip 18a from being directly splashed by muddy water from the outside. Thus, the wheel bearing apparatus provides both high sealability and low bearing torque.

In the first and second side lips 18a and 18b, the interference of the first side lip 18a against the slinger 17 is set larger than that of the second side lip 18b. Accordingly, it is possible to reduce wear of the second side lip 18b and thus maintain high sealability for a long term if the first side lip 18a is abraded and its interference reduced.

FIG. 6 is a partially enlarged sectional view showing a modification of the seal shown in FIG. 5. This embodiment is different from the previous embodiment only in the structure of the slinger. Thus, the same reference numerals are used as those used in the previous embodiment to designate the same structural elements in this modified embodiment, except for the slinger.

This seal 9' includes a slinger 17' and the sealing plate 12 opposite to one another. The slinger 17' is made by press forming an austenitic stainless steel sheet (JIS SUS 304 etc.) or preserved cold rolled sheet (JIS SPCC etc.). The slinger 17' has a cross-section with a substantially "L" shaped configuration. The slinger 17' has a cylindrical portion 17a, fit into the inner ring 3, a standing plate portion 17b, extending radially outward from the cylindrical portion 11, an inclined portion 17c, bent at a tip of the standing plate portion 17b at a predetermined inward angle, and a stop portion 17d, bent radially outward at the end of the cylindrical portion 17a.

The stop portion 17d can be formed by plastically deforming the end of the cylindrical portion 17a after a temporal assembly of the slinger 17' and the sealing plate 12. The stop portion 17d is arranged so that it can radially overlap the inner end portion 18c of the sealing member 18, via an axial gap. Accordingly, it is possible to prevent separation of the slinger 17' and the sealing plate 12 during the assembly stage of the bearing or the transportation stage not only by the radial lip 18d but the stop portion 17d. Thus, it is possible to unite two members 17' and 12 as a unit and assemble it onto the bearing. This enables easy assembly of the seal onto the bearing as well as to improve assembling accuracy. In addition, an effective labyrinth seal 15' is formed not only by the radial gap formed between the inner cylindrical end 18c of the sealing member 18 and the cylindrical portion 17a but by a slight axial gap formed between the stop portion 17d and the inner end 18c of the sealing member 18. Thus, the sealability can be further improved.

A third embodiment of the present invention will be described with reference to the accompanying drawings where the same reference numerals as those used in previous embodiment are used to designate the same structural elements as those used in the previous embodiment.

Figure 7:
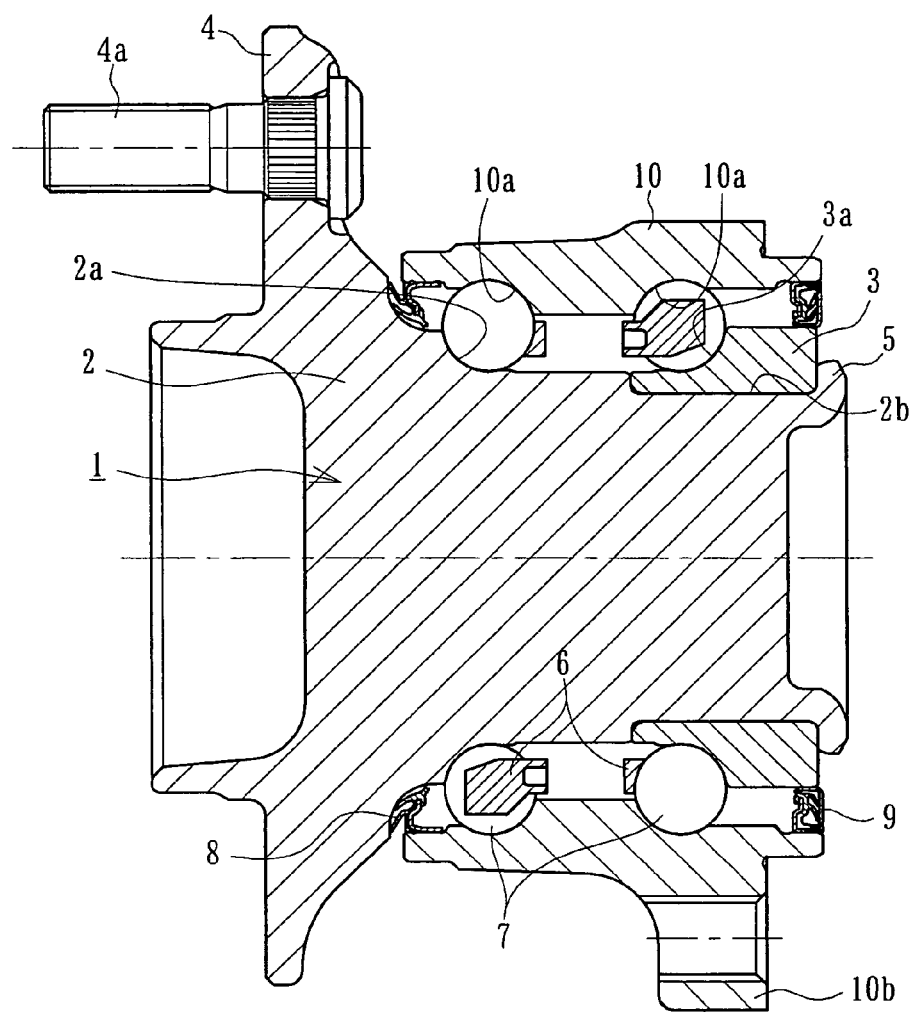
FIG. 7 is a longitudinal-section view of a wheel bearing apparatus of a third embodiment.
Figure 8:
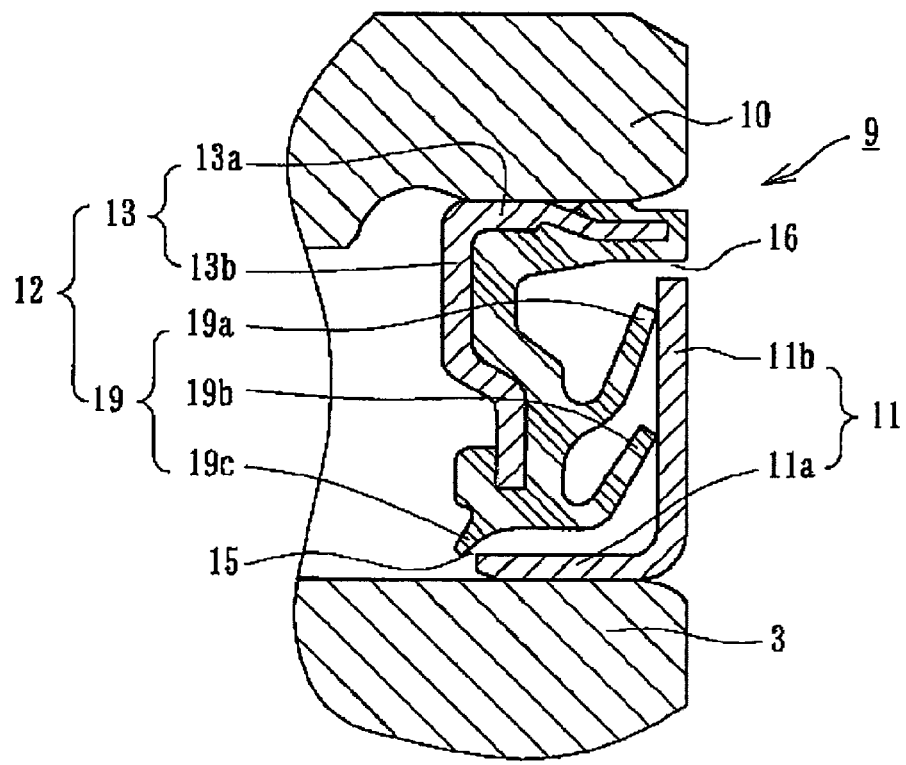
FIG. 8 is a partially enlarged sectional view of the inner-side seal of FIG. 7.
Figure 9:
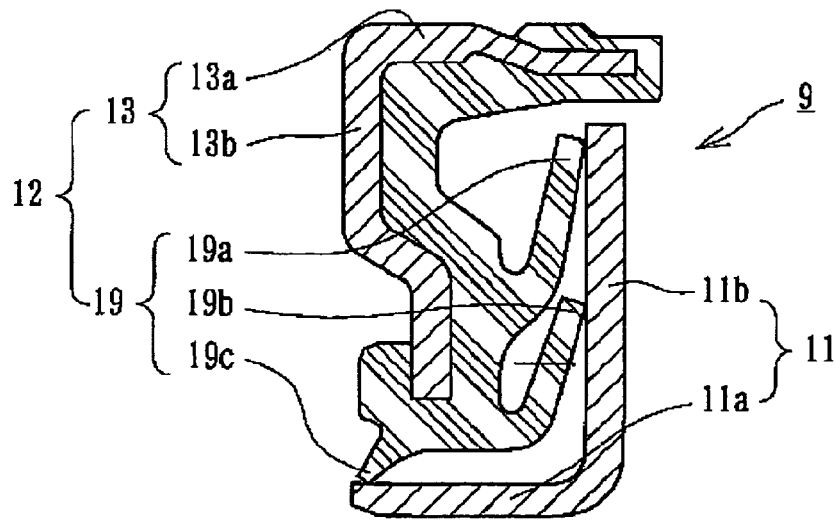
FIG. 9 is a partially enlarged sectional view of a condition before the seal of FIG. 7 is mounted between the outer and inner members.

FIG. 7 is a longitudinal-section view of a wheel bearing apparatus of a third embodiment, FIG. 8 is a partially enlarged sectional view of the inner-side seal of FIG. 7. FIG. 9 is a partially enlarged sectional view of the seal showing a condition before the seal is mounted between the outer and inner members. In the description below, the term "outer-side" of the wheel bearing apparatus denotes a side which is positioned outside, left side in drawings, of the vehicle body. The term "inner-side" of the wheel bearing apparatus denotes a side which is positioned inside, right side in drawings, of the vehicle body when the wheel bearing apparatus is mounted on the vehicle body.

The wheel bearing apparatus of FIG. 7 is used for a driven wheel and has a so-called "third generation" structure. The apparatus includes inner and outer members 1 and 10 with double row rolling elements (balls) 7 and 7 rollably contained between the inner and outer members 1 and 10. The inner member 1 has a wheel hub 2 and an inner ring 3 press fit onto the wheel hub 2, via a predetermined interference.

The wheel hub 2 is integrally formed with a wheel mounting flange 4. The wheel hub 2 has, on its outer circumference, one outer-side inner raceway surface 2a of the inner raceway surfaces 2a and 3a. A cylindrical portion 2b axially extends from the inner raceway surface 2a. Hub bolts 4a are mounted equidistantly about the periphery of the wheel mounting flange 4. The inner ring 3 is formed with the other inner-side inner raceway surface on its outer circumference. The inner ring 3 is press fit onto the cylindrical portion 2b, via a predetermined interference. The inner ring 3 is immovably secured in the axial direction relative to the wheel hub 2 in a pre-stressed condition by a caulked portion 5. The caulked portion 5 is formed by plastically deforming the end of the cylindrical portion 2b.

The outer member 10 is integrally formed with a body mounting flange on its outer circumference. The body mounting flange 10b is mounted on a knuckle (not shown) to form a portion of a suspension apparatus. The outer member is formed with double row outer raceway surfaces 10a, 10a on its inner circumference. The double row outer raceway surfaces 10a and 10a are opposite to the inner raceway surfaces 2a and 3a of the inner member 1. The double row rolling elements 7 and 7 are rollably contained between the inner raceway surfaces 2a and 3a and outer raceway surfaces 10a and 10a. The outer member 10 is made of medium carbon steel such as S53C including carbon of 0.40~0.80% by weight. At least the double row outer raceway surfaces 10a and 10a are hardened by high frequency induction hardening to have a surface hardness of 58~64 HRC.

Seals 8 and 9 are arranged at either ends of the outer member 10 in seal openings or annular spaces formed between the inner and outer members 1 and 10. The seals 8 and 9 prevent leakage of lubricating grease contained within the bearing and immigration of rain water or dust into the bearing.

The wheel hub 2 is made of medium carbon steel such as S53C including carbon of 0.40~0.80% by weight. The wheel hub 2 is formed with a hardened layer by high frequency induction hardening to have a surface hardness of 58~64 HRC from the base of the wheel mounting flange 4 which forms a seal land portion for an outer-side seal 8, to the cylindrical portion 2b. The caulked portion 5 is not hardened and remained as is after forging. The inner ring 3 is made of high carbon chrome bearing steel such as SUJ2 and is hardened to its core by dip hardening to have a hardness of 58~64 HRC.

As shown in an enlarged view of FIG. 8, the inner-side seal 9 of the seals 8 and 9 includes a slinger 11 and an annular sealing plate 12. The slinger 11 is made by press forming an austenitic stainless steel sheet (JIS SUS 304 etc.) or preserved cold rolled sheet (JIS SPCC etc.). The slinger has a cross-section which has a substantially "L" shaped configuration. The slinger has a cylindrical portion 11a, fit into the inner ring 3, and a standing plate portion 11b, extending radially outward from the cylindrical portion 11a. Accordingly it is possible to prevent the generation of corrosion in the slinger 11. Thus, this improves the durability of the seal 9 and reduces manufacturing costs.

The sealing plate 12 is formed to have a substantially "L" shaped cross-section and is mounted on the outer member 10. The sealing plate 12 includes the metal core 13 and the sealing member 19 vulcanized adhered to the metal core 13. The metal core 13 is made by press forming an austenitic stainless steel sheet (JIS SUS 304 etc.) or preserved cold rolled sheet (JIS SPCC etc.). The metal core 13 has a cylindrical portion 13a, to be inserted into the end of the outer member 10, and a standing plate portion 13b, extending radially inward from the cylindrical portion 13a.

The sealing member 19 is made from synthetic rubber such as nitrile rubber. The sealing member 19 has first and second side lips 19a and 19b in sliding contact with the standing plate portion 11b of the slinger 11. The first and second side lips 19a and 19b are formed to have an inclination extending radially outward from the standing plate portion 13b of the metal core 13. The tips of the side lips 19a and 19b are adapted to be contacted with the standing plate portion 11b of the slinger 11, via predetermined interfaces respectively.

The sealing member 19 extends from the radially inner surface of the cylindrical portion 13a of the metal core 13 to a portion on its radially outer surface to surround the circumferential edge of the cylindrical portion 13a to improve the sealability against the outer member 10. The sealing member 19 is formed with a grease lip 19c projecting toward the cylindrical portion 11a of the slinger 11. The grease lip 19c is arranged oppositely to the cylindrical portion 11a of the slinger 11, via a slight gap therebetween. A labyrinth seal 15 is formed by the gap and can prevent leakage of grease contained within the bearing.

Since the grease lip 19c does not contact the slinger 11, seal torque created by the seal 9 can be remarkably reduced. Furthermore, a labyrinth seal 16 is formed by a slight gap between the standing plate portion 11b of the slinger 11 and the metal core 13. The seal 16 prevents the first and second side lips 19a and 19b from being directly splashed by rain water or dust.

According to this embodiment, since the dust lip used in the bearing seal of the prior art is omitted, a plurality of side lips, first and second side lips 19a and 19b, contact the standing plate portion 11b of the slinger 11, via a predetermined interference. Also, the grease lip 19c does not contact the slinger 11. Thus, the labyrinth seal 15 is formed therebetween. Thus, it is possible to provide a wheel bearing apparatus which maintains the sealability of seal 9 and further reduce the bearing torque.

In addition, according to the wheel bearing apparatus of this embodiment, the grease lip 19c of the sealing plate 12 and the cylindrical portion 11a of the slinger 11 are maintained in a mutually contacting condition before the seal 9 is mounted between the inner and outer members 1 and 10, during assembly of the seal to the bearing or transportation of the seal. Thus, it is possible to avoid separation of the sealing plate 12 and the slinger 11 from each other. Thus, this reduces the workability during assembly of the seal onto the bearing.

That is, prior to assembling of the seal 9 onto the bearing, the grease lip 19c is kept in contact with the cylindrical portion 11a of the slinger 11 to prevent separation of them by frictional force acting therebetween. On the other hand, during assembly of the seal 9 to the bearing, the grease lip 19c is separated from the cylindrical portion 11a of the slinger 11 so that the grease lip 19c does not contact the cylindrical portion 11a. Accordingly, it is possible to assemble the two members, the sealing plate 12 and the slinger 11, as a unit onto the bearing. Thus, this improves the ease of assembly and assembling accuracy and reduces the seal torque after assembly.

A fourth embodiment of the present invention will be described with reference to accompanying drawings where same reference numerals as those used in previous embodiment are used to designate same structural elements as those used in the previous embodiment.

Figure 10:
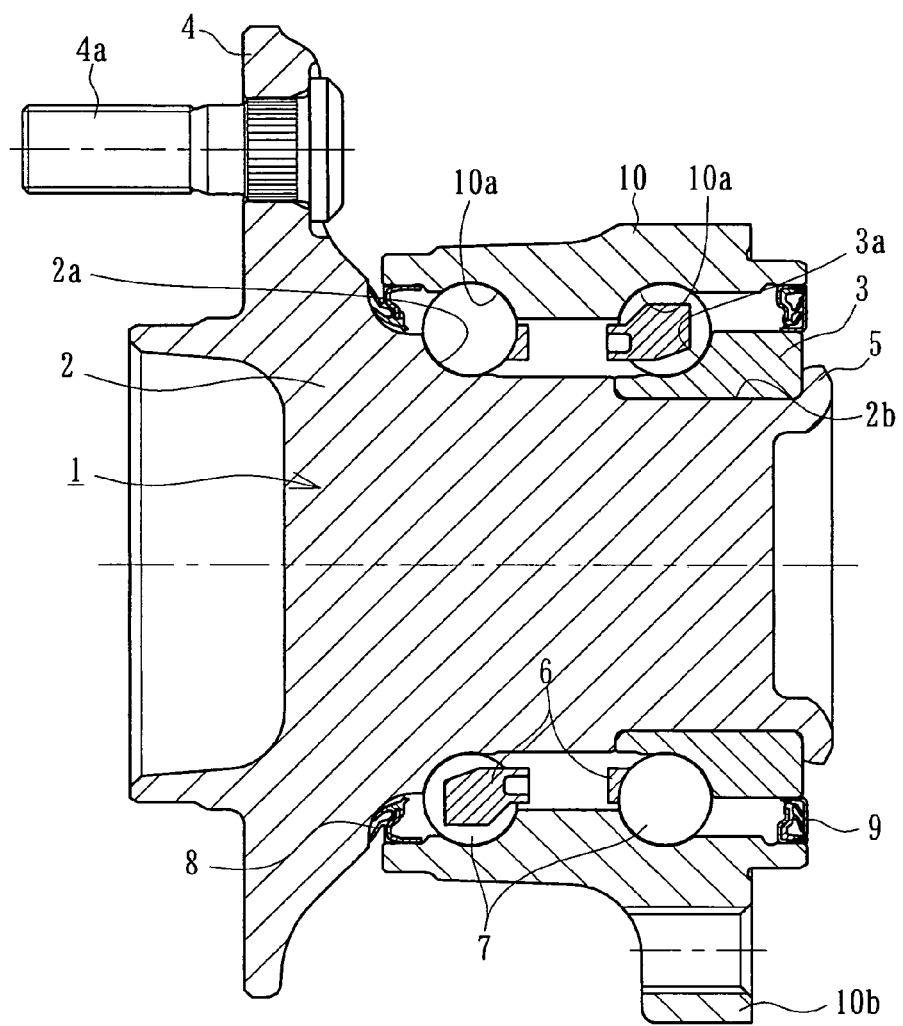
FIG. 10 is a longitudinal-section view of a wheel bearing apparatus of a fourth embodiment.
Figure 11:
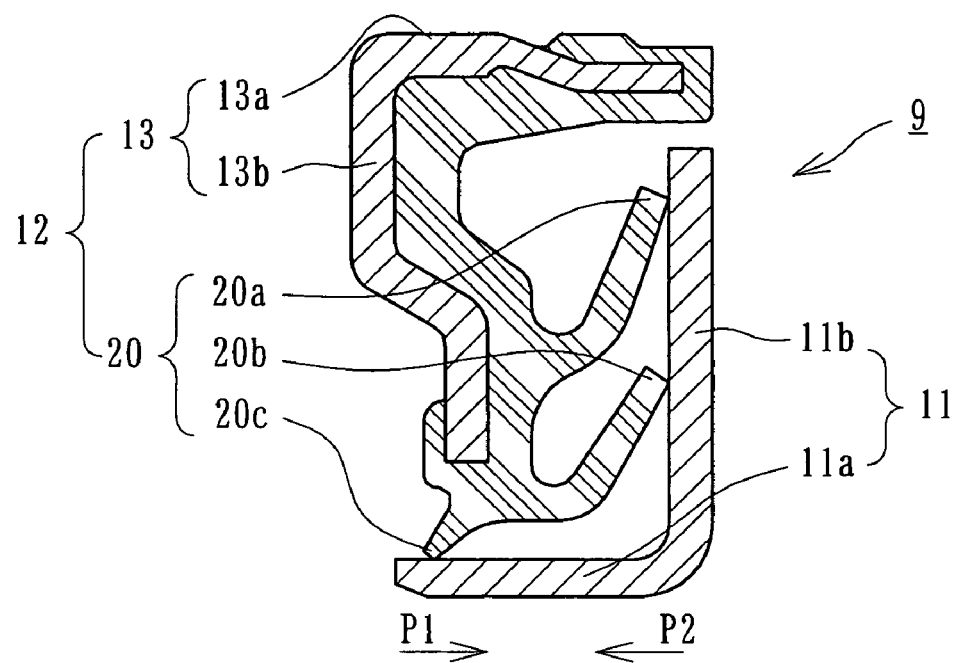
FIG. 11 is a partially enlarged sectional view of a condition before the seal of FIG. 10 is mounted between the outer and inner members.

FIG. 10 is a longitudinal-section view of a wheel bearing apparatus. FIG. 11 is a partially enlarged sectional view of the seal showing a condition before the seal of FIG. 10 is mounted between the outer and inner members. In the description below, the term "outer-side" of the wheel bearing apparatus denotes a side which is positioned outside, left side in drawings, of the vehicle body. The term "inner-side" of the wheel bearing apparatus denotes a side which is positioned inside, right side in drawings, of the vehicle body when the wheel bearing apparatus is mounted on the vehicle body.

The wheel bearing apparatus of FIG. 10 is that used for a driven wheel and has a so-called "third generation" structure. The apparatus includes inner and outer members 1 and 10 with and double row rolling elements (balls) 7 and 7 rollably contained between the inner and outer members 1 and 10. The inner member 1 comprises a wheel hub 2 and an inner ring 3 press fit onto the wheel hub 2 via a predetermined interference.

The wheel hub 2 is integrally formed with a wheel mounting flange 4. The wheel hub 2 has, on its outer circumference, one outer-side inner raceway surface 2a of inner raceway surfaces 2a and 3a. A cylindrical portion 2b axially extends from the inner raceway surface 2a. Hub bolts 4a are mounted equidistantly about the periphery of the wheel mounting flange 4. The inner ring 3 is formed with the other inner-side inner raceway surface 3a on its outer circumference. The inner ring 3 is press fit onto the cylindrical portion 2b via a predetermined interference. The inner ring 3 is immovable secured in the axial direction relative to the wheel hub 2 in a pre-stressed condition by a caulked portion 5. The caulked portion is formed by plastically deforming the end of the cylindrical portion 2b.

The outer member 10 is integrally formed with a body mounting flange on its outer circumference. The body mounting flange 10b is mounted on a knuckle (not shown) to form a portion of a suspension apparatus. The outer member 10 is formed with double row outer raceway surfaces 10a, 10a on its inner circumference. The double row outer raceway surfaces 10a and 10a are opposite to the inner raceway surfaces 2a and 3a of the inner member 1. The double row rolling elements 7 and 7 are rollably contained between the inner raceway surfaces 2a and 3a and outer raceway surfaces 10a and 10a. The outer member 10 is made of medium carbon steel such as S53C including carbon of 0.40~0.80% by weight. At least the double row outer raceway surfaces 10a and 10a are hardened by high frequency induction hardening to have a surface hardness of 58~64 HRC.

Seals 8 and 9 are arranged at either ends of the outer member 10 in seal openings or annular spaces formed between the inner and outer members 1 and 10. The seals 8 and 9 prevent leakage of lubricating grease contained within the bearing and the immigration of rain water or dust into the bearing.

The wheel hub 2 is made of medium carbon steel such as S53C including carbon of 0.40~0.80% by weight. The wheel hub 2 is formed with a hardened layer by high frequency induction hardening to have a surface hardness of 58~64 HRC from the base of the wheel mounting flange 4, which forms a seal land portion for an outer-side seal 8, to the cylindrical portion 2b. The caulked portion 5 is not hardened and remained as it is after it is forged. The inner ring 3 is made of high carbon chrome bearing steel such as SUJ2 and is hardened to its core by dip hardening to have a hardness of 58~64 HRC.

As shown in an enlarged view of FIG. 11, the inner-side seal 9 of the seals 8 and 9 includes a slinger 11 and an annular sealing plate 12. The slinger 11 is made by press forming an austenitic stainless steel sheet (JIS SUS 304 etc.) or preserved cold rolled sheet (JIS SPCC etc.). The slinger 12 has a cross-section which has a substantially "L" shaped configuration. The slinger 12 has a cylindrical portion 11a, fit into the inner ring 3, and a standing plate portion 11b, extending radially outward from the cylindrical portion 11a. Accordingly, it is possible to prevent the generation of corrosion in the slinger 11. Thus, this and thus to improves the durability of the seal 9 and reduce manufacturing costs.

The sealing plate 12 is formed with a substantially "L" shaped cross-section and is mounted on the outer member 10. The sealing plate 12 includes the metal core 13 and the sealing member 20 vulcanized adhered to the metal core 13. The metal core 13 is made by press forming an austenitic stainless steel sheet (JIS SUS 304 etc.) or preserved cold rolled sheet (JIS SPCC etc.). The metal core 13 has a cylindrical portion 13a, to be inserted into the end of the outer member 10, and a standing plate portion 13b, extending radially inward from the cylindrical portion 13a.

The sealing member 20 is made from synthetic rubber such as nitrile rubber. The sealing member 20 has first and second side lips 20a and 20b in sliding contact with the standing plate portion 11b of the slinger 11. The first and second side lips 20a and 20b have an inclination extending radially outward from the standing plate portion 13b of the metal core 13. The tips of the side lips 20a and 20b are adapted to contact the standing plate portion 11b of the slinger 11, via predetermined interfaces. The plurality of side lips, two side lips in this embodiment, makes it possible to maintain the sealability of the seal even though the dust lip(s) of the prior art is omitted.

The sealing member 20 extends from the radially inner surface of the cylindrical portion 13a of the metal core 13 to a portion on its radially outer surface to surround the circumferential edge of the cylindrical portion 13a to improve the sealability against the outer member 10. The sealing member 20 is formed with a grease lip 20c projecting toward the cylindrical portion 11a of the slinger 11. The grease lip 20c has a predetermined amount of frictional force against the cylindrical portion 11a of the slinger 11.

In this embodiment, the frictional force P1, contacting load against the cylindrical portion 11a of the slinger 11, of the grease lip 20c and the contacting load P2, total contacting load of the first and second side lips, of the first and second side lips 20a and 20b are set so as to have a relation as shown below.

$P1 \geqq P2$

The frictional force P1 of the grease lip 20c is set so that it is equal to the total contacting load P2 of the first and second side lips 20a and 20b. Further, the former (P1) is larger than the latter (P2). The contacting load P2 of the first and second lips 20a and 20b is a force acting to separate the sealing plate 12 from the slinger 11, force acting toward the left hand in FIG. 11. The frictional force P1 of the grease lip 20c is a force acting against the separating force P2, force acting toward the right hand in FIG. 11. Accordingly, it is possible to avoid the separation of the sealing plate 12 and the slinger 11 from each other before mounting the seal 9 as a unit onto the bearing by setting the relationship mentioned above.

Since the sealing plate 12 and the slinger 11 can be assembled onto the bearing as a unit, the workability of assembling the seal 9 to the bearing can be improved. In addition, it is possible to improve the workability and assembling accuracy by setting the frictional force P1 of the grease lip against the cylindrical portion 11a of the slinger 11 at 12N as well as by setting the contacting load P2 of two side lips against the standing plate portion 11b of the slinger 11 at 8N.

According to this embodiment, since the dust lip(s) of the prior is omitted, a plurality of side lips, first and second side lips 20a and 20b, are provided which are adapted to contact with the standing plate portion 11b of the slinger 11. By keeping the predetermined contacting load P2, as well as the grease lip 20c having the predetermined frictional force P1 against the cylindrical portion 11a of the slinger 11 and the relation is $P1 \geqq P2$, it is possible to provide a wheel bearing apparatus which maintains the sealability of the seal 9 and improves the workability during assembly of the seal 9 onto the bearing.

A fifth embodiment will be described with reference to the accompanying drawings where the same reference numerals as those used in previous embodiment are used to designate the same structural elements as those used in the previous embodiment.

Figure 12:
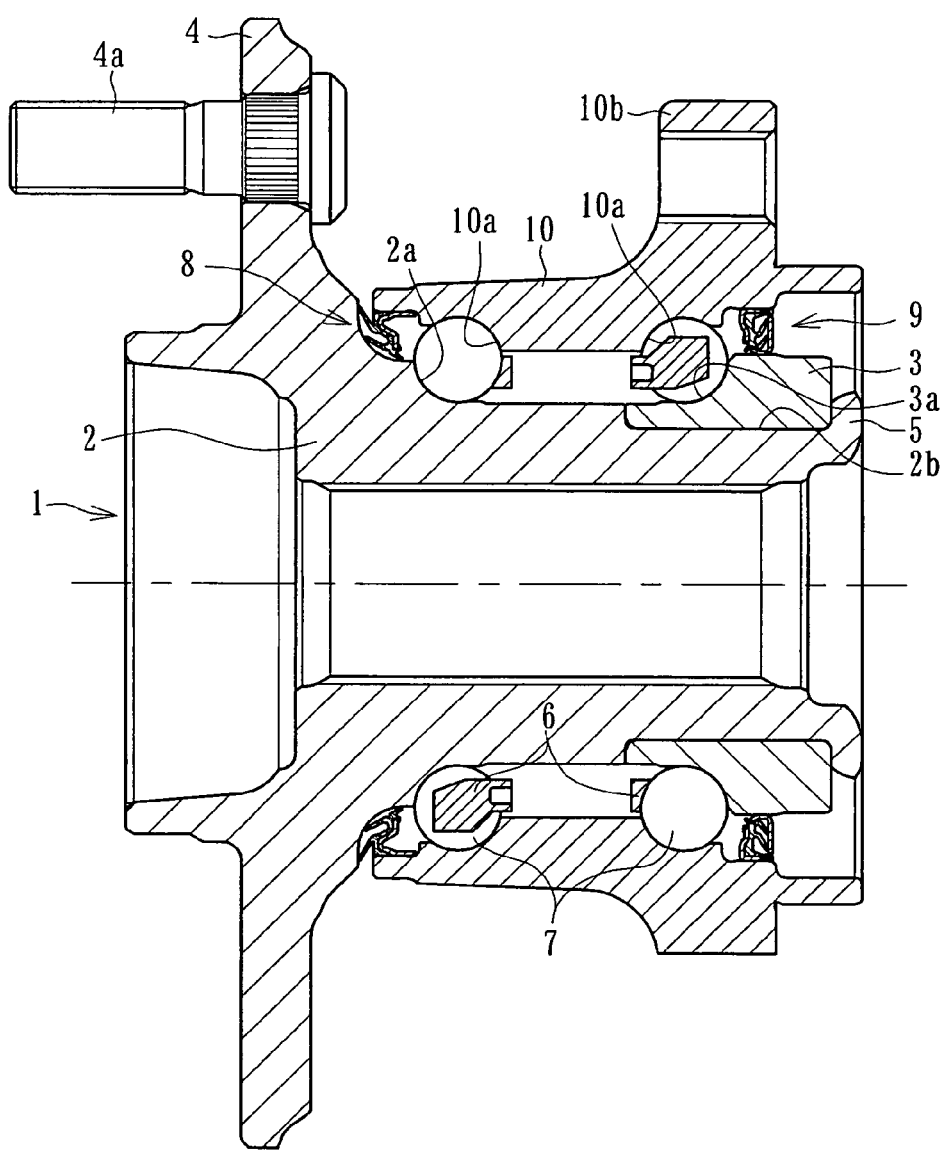
FIG. 12 is a longitudinal-section view of a wheel bearing apparatus of a fifth embodiment.
Figure 13:
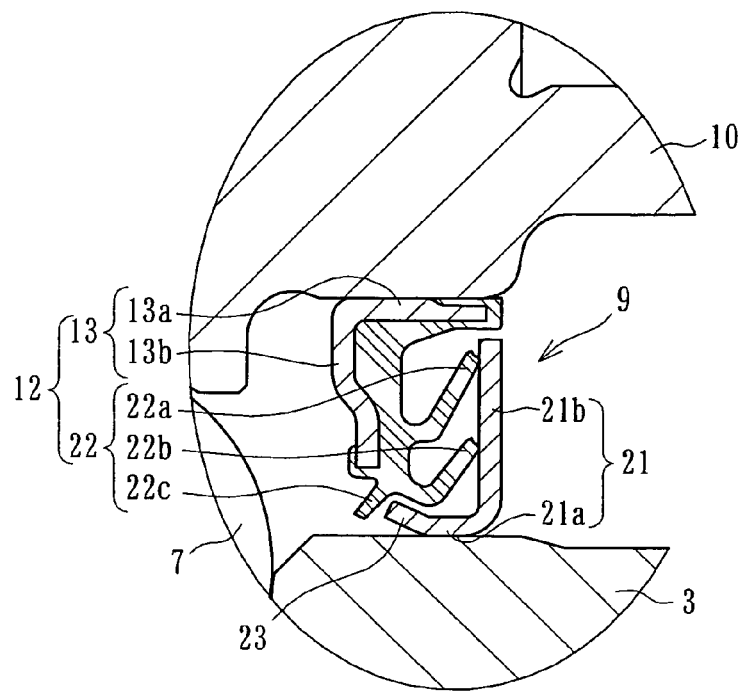
FIG. 13 is a partially enlarged sectional view of the inner-side seal of FIG. 12.

FIG. 12 is a longitudinal-section view of a wheel bearing apparatus of a fifth embodiment, and FIG. 13 is a partially enlarged sectional view of the seal of FIG. 12. FIG. 14(a) is a partially enlarged sectional view showing a condition where a bent portion 23 of a slinger 21 is separated. FIG. 14(b) is a partially enlarged sectional view showing a condition where the bent portion of the slinger 21 is in contact with the side lip 22b. In the description below, the term "outer-side" of the wheel bearing apparatus denotes a side which is positioned outside, left side in drawings, of the vehicle body. The term "inner-side" of the wheel bearing apparatus denotes a side which is positioned inside, right side in drawings, of the vehicle body when the wheel bearing apparatus is mounted on the vehicle body.

The wheel bearing apparatus of FIG. 12 is that used for a driving wheel and has a so-called "third generation" structure. The apparatus includes inner and outer members 1 and 10 with double row rolling elements (balls) 7 and 7 rollably contained between the inner and outer members 1 and 10. The inner member 1 includes a wheel hub 2 and an inner ring 3 press fit onto the wheel hub 2, via a predetermined interference.

The wheel hub 2 is integrally formed with a wheel mounting flange 4. The wheel hub has one outer-side inner raceway surface 2a of inner raceway surfaces 2a and 3a on its outer circumference. A cylindrical portion 2b axially extends from the inner raceway surface 2a. Hub bolts 4a are mounted equidistantly about the periphery of the wheel mounting flange 4. The inner ring 3 is formed with the other inner-side inner raceway surface 3a on its outer circumference. The inner ring 3 is press fit onto the cylindrical portion 2b, via a predetermined interference. The inner ring 3 is immovable secured in the axial direction relative to the wheel hub 2 in a pre-stressed condition by a caulked portion 5. The caulked portion 5 is formed by plastically deforming the end of the cylindrical portion 2b.

The outer member 10 is integrally formed with a body mounting flange on its outer circumference. The body mounting flange 10b is mounted on a knuckle (not shown) to form a portion of a suspension apparatus. The outer member 10 includes double row outer raceway surfaces 10a, 10a on its inner circumference. The double row outer raceway surfaces 10a and 10a are opposite to the inner raceway surfaces 2a and 3a of the inner member 1. The double row rolling elements 7 and 7 are rollably contained between the inner raceway surfaces 2a and 3a and outer raceway surfaces 10a and 10a. The outer member 10 is made of medium carbon steel such as S53C including carbon of 0.40~0.80% by weight. At least the double row outer raceway surfaces 10a and 10a are hardened, by high frequency induction hardening, to have surface hardness of 58~64 HRC.

Seals 8 and 9 are arranged at either ends of the outer member 10 in seal openings or annular spaces formed between the inner and outer members 1 and 10. The seals 8 and 9 prevent leakage of lubricating grease contained within the bearing and the immigration of rain water or dust into the bearing.

The wheel hub 2 is made of medium carbon steel such as S53C including carbon of 0.40~0.80% by weight. The wheel hub 2 is formed with a hardened layer by high frequency induction hardening to have a surface hardness of 58~64 HRC from the base of the wheel mounting flange 4, which forms a seal land portion for an outer-side seal 8, to the cylindrical portion 2b. The caulked portion 5 is not hardened and remained as is after forging. The inner ring 3 is made of high carbon chrome bearing steel such as SUJ2 and is hardened to its core by dip hardening to have a hardness of 58~64 HRC.

As shown in an enlarged view of FIG. 13, the inner-side seal 9 of the seals 8 and 9 include a slinger 21 and an annular sealing plate 12. The slinger 21 is made by press forming an austenitic stainless steel sheet (JIS SUS 304 etc.) or preserved cold rolled sheet (JIS SPCC etc.). The slinger 21 has a cross-section which has a substantially "L" shaped configuration. The slinger has a cylindrical portion 21a, fit into the inner ring 3, and a standing plate portion 21b, extending radially outward from the cylindrical portion 21a. Accordingly, it is possible to prevent the generation of corrosion in the slinger 21. Thus, this improves the durability of the seal 9 and reduces the manufacturing costs.

The sealing plate 12 is formed to have a substantially "L" shaped cross-section and is mounted on the outer member 10. The sealing plate 12 comprises the metal core 13 and the sealing member 22 vulcanized adhered to the metal core 13. The metal core 13 is made by press forming an austenitic stainless steel sheet (JIS SUS 304 etc.) or preserved cold rolled sheet (JIS SPCC etc.). The metal core 13 includes a cylindrical portion 13a, to be inserted into the end of the outer member 10, and a standing plate portion 13b, extending radially inward from the cylindrical portion 13a.

The sealing member 22 is formed from of synthetic rubber such as nitrile rubber. The sealing member has first and second side lips 22a and 22b in sliding contact with the standing plate portion 21b of the slinger 21. The first and second side lips 22a and 22b are formed to have an inclination extending radially outward from the standing plate portion 13b of the metal core 13. The tips of the side lips 22a and 22b are adapted to contact with the standing plate portion 21b of the slinger 21, via predetermined interfaces, respectively.

The sealing member 22 extends from the radially inner surface of the cylindrical portion 13a of the metal core 13 to a portion on its radially outer surface to surround the circumferential edge of the cylindrical portion 13a to improve the sealability against the outer member 10. The sealing member is formed with a grease lip 22c projecting toward the cylindrical portion 21a of the slinger 21.

In this embodiment, the tip of the cylindrical portion 21a of the slinger 21 is bent radially outward, toward the sealing plate 12, to form a bent portion 23. The tip of the grease lip 22s projects to a position on the outer-side, left hand in FIG. 14, of the tip of the bent portion 23, tip of the cylindrical portion 21a. Accordingly, the tip of the grease lip 22c does not contact the cylindrical portion 21a, including the bent portion 23, and a labyrinth seal is formed by a gap between the grease lip 22c and the tip of the slinger 21. This labyrinth seal prevents leakage of lubricating grease contained within the bearing.

Since the grease lip 22c does not contact the slinger 21, seal torque created by the seal 9 can be remarkably reduced. Furthermore, a labyrinth seal is formed by a slight gap between the standing plate portion 21b of the slinger 21 and the metal core 13. The seal prevents the first and second side lips 22a and 22b from being directly splashed by rain water or dust.

According to this embodiment, the dust lip used in the bearing seal of the prior art is omitted. A plurality of side lips, first and second side lips 22a and 22b, contact the standing plate portion 21b of the slinger 21, via a predetermined interference. The grease lip 22c does not contact the slinger 21.

Thus, the labyrinth seal is formed therebetween. Thus, it is possible to provide a wheel bearing apparatus which maintains the sealability of seal 9 and further reduces the bearing torque.

Figure 14:
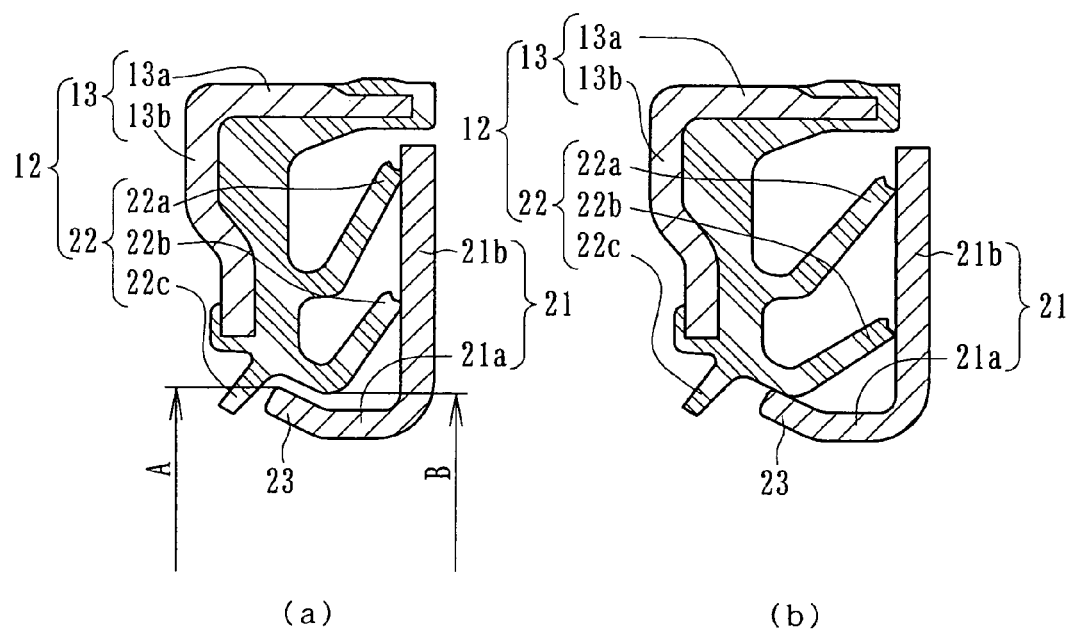
FIG. 14(a) is a partially enlarged sectional view of a condition where the bent portion and the side lip of FIG. 13 are separated.
FIG. 14(b) is a partially enlarged sectional view of a condition where the bent portion and the side lip of FIG. 13 contact each other.

In the wheel bearing apparatus of this embodiment, as shown in FIG. 14(*a*), it is set so that an outer diameter "A", diameter of the radially outwardly projected end of the bent portion 23, of the bent portion 23 is larger than an inner diameter "B", diameter of the radially inwardly projected end of the second side lip 22*b*, of the radially innermost side lip, second side lip 22*b* in this embodiment. Accordingly, it is possible to prevent the separation between the sealing plate 12 and the slinger 21 and thus deterioration in workability.

As shown in FIG. 14 (*b*), prior to assembly of the seal 9 to the bearing, the second side lip 22*b* abuts the bent portion 23 of the slinger 21 and cannot pass over it although the slinger 21 is pushed away from the sealing plate 12 by the spring force of the first and second side lips 22*a* and 22*b*. Thus, separation of the slinger 21 from the sealing plate 12 is prevented. Thus, it is possible to assemble the slinger 21 and sealing plate 12 as a unit onto the bearing to improve workability during assembly as well as assembling accuracy and to reduce the seal torque after assembly of bearing.

Figure 15:
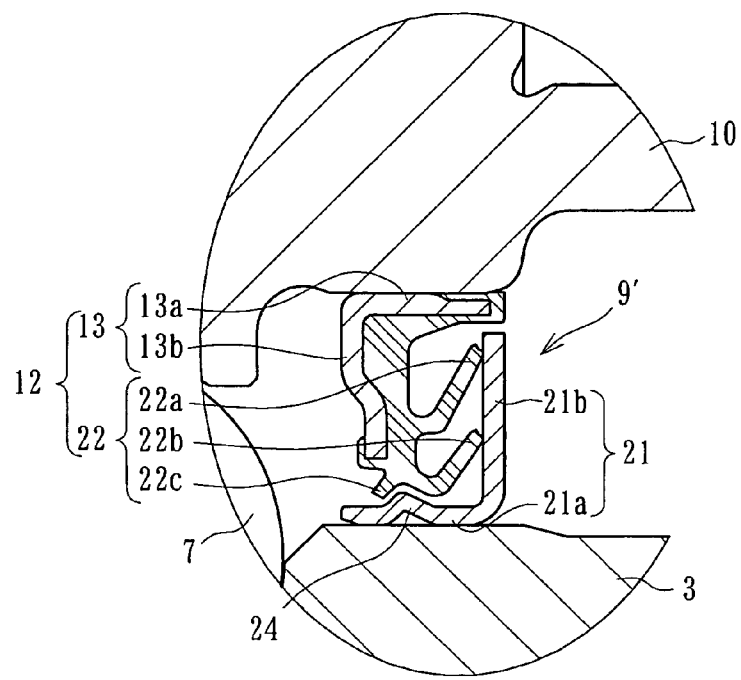
FIG. 15 is a partially enlarged sectional view of a modified embodiment of the inner-side seal.
Figure 16:
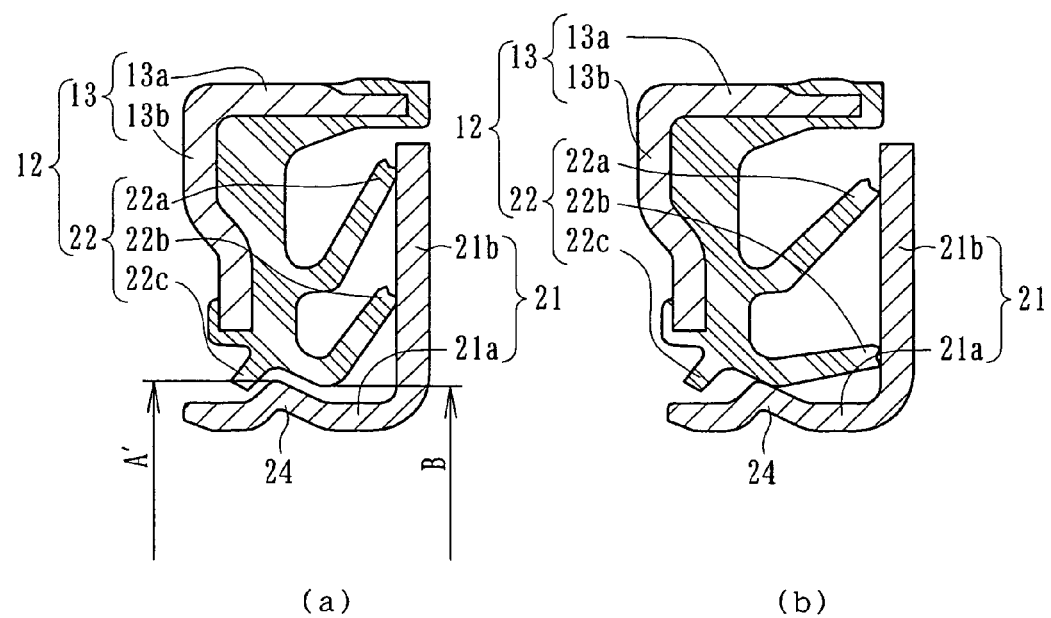
FIG. 16(a) is a partially enlarged sectional view of a condition where the bent portion and the side lip of FIG. 15 are separated.
FIG. 16(b) is a partially enlarged sectional view of a condition where the bent portion and the side lip of FIG. 15 contact each other.
Figure 17:
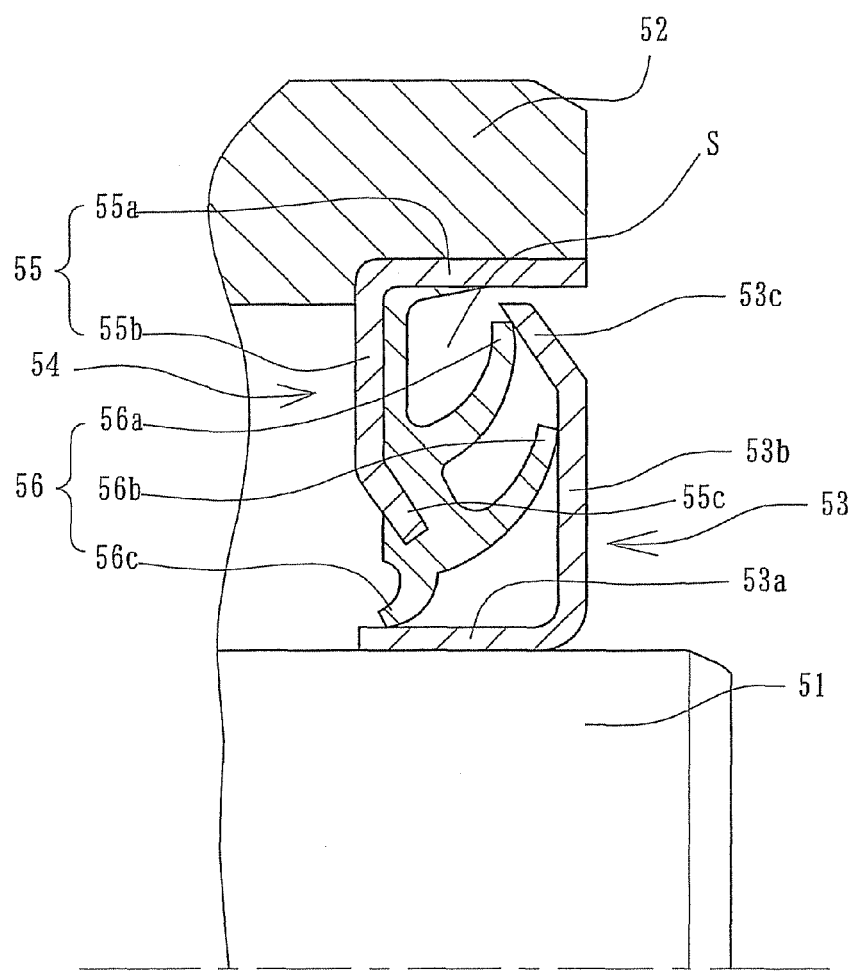
FIG. 17 is a partially enlarged sectional view of a prior art seal in a mounted condition.

FIG. 15 and FIGS. 16 (*a*) and (*b*) are partially enlarged views showing a modification of the seal shown in FIGS. 13 and 14. As shown in FIG. 15, a seal 9' of this embodiment has a bent portion 24 formed by deforming the middle portion of the cylindrical portion 21*a* of the slinger 21. The tip of the grease lip 22*c* is arranged so that it opposes the cylindrical portion 21*a* of the slinger 21 at a position axially outward of the bent portion 24.

Accordingly labyrinth seals are formed between the tip of the grease lip 22*c* and the cylindrical portion 21*a* of the slinger 21 and between the grease lip 22*c* and the bent portion 24 of the slinger 21. These labyrinth seals can prevent leakage of lubricating grease contained within the bearing. Since the grease lip 22*c* does not contact the slinger 21, it is possible to remarkably reduce the seal torque by the seal 9'.

According to this embodiment, the dust lip used in the bearing seal of the prior art is omitted. A plurality of side lips, first and second side lips 22*a* and 22*b*, contact the standing plate portion 21*b* of the slinger 21, via a predetermined interference. The grease lip 22*c* does not contact the slinger 21. Thus, the labyrinth seal is formed therebetween. Thus, it is possible to provide a wheel bearing apparatus which can maintain the sealability of seal 9' and further reduce the bearing torque.

In addition, as shown in FIG. 16(*a*), an outer diameter A', diameter of the radially outwardly projected end of the bent portion 24, of the bent portion 24 is set larger than an inner diameter B, diameter of the radially inwardly projected end of the second side lip 22*b*, of the radially innermost side lip, second side lip 22*b* in this embodiment. Accordingly, it is possible to prevent the separation between the sealing plate 12 and the slinger 21 and thus deterioration in workability.

As shown in FIG. 16(*b*), prior to assembly of the seal 9' onto the bearing, the second side lip 22*b* abuts the bent portion 24 of the slinger 21 and cannot pass over it although the slinger 21 is pushed away from the sealing plate 12 by the spring force of the first and second side lips 22*a* and 22*b*. Thus, separation of the slinger 21 from the sealing plate 12 is prevented. Thus, it is possible to assemble the slinger 21 and sealing plate 12 as a unit onto the bearing to improve workability during assembly as well as assembling accuracy and to reduce the seal torque after the assembly of bearing.

Although the above embodiments are shown with double row angular ball bearings using balls as the rolling elements 7, the present disclosure is not limited to these examples and thus can be applied to a double row tapered roller bearing using tapered rollers as the rolling elements and also to a bearing using a combination of balls and tapered rollers as the rolling elements 7. In addition, the present disclosure can be applied not only to the illustrated third generation type but to the first, second and fourth generation types if the wheel bearing apparatus is of the inner ring rotation type. In the first and second generation types, the seals of the present invention can be applied not only to the inner-side but to the outer-side.

The wheel bearing apparatus of the present invention can be applied to the first, second, third and fourth wheel bearing apparatus of the inner ring rotation type.

The present disclosure has been described with reference to the preferred embodiments. Obviously, modifications and alternations will be occurring to those of ordinary skill in the art upon reading and understanding the preceding detailed description. It is intended that the present disclosure be construed as including all such alternations and modifications insofar as they come within the scope of the appended claims or their equivalents.

What is claimed is:

1. A wheel bearing apparatus comprising:
    an outer member formed with double row outer raceway surfaces on its inner circumferential surface;
    an inner member including a wheel hub having an integrally formed wheel mounting flange at one end and a cylindrical portion axially extending from the wheel mounting flange, at least one inner ring being fit onto the cylindrical portion of the wheel hub, the inner ring being formed with an inner raceway surface on its outer circumferential surface, said inner raceway surface arranged oppositely to one of the double row outer raceway surfaces;
    double row rolling elements rollably arranged between the outer and inner raceway surfaces, via cages;
    seals mounted in openings or annular spaces formed between the outer member and the inner member; and
    at least an inner-side seal of the seals comprises a slinger and an annular sealing plate, each having a substantially "L" shaped cross-section and arranged opposite to one another, the slinger comprises a cylindrical portion, fit onto the inner member, and a standing plate portion, extending radially outward from the cylindrical portion, the sealing plate comprises a metal core press fitted in the outer member and a sealing member integrally vulcanized adhered to the metal core; and the sealing member is formed with a plurality of side lips and a grease lip, each tip of said plurality of side lips slidingly contacts the standing plate portion of the slinger with a predetermined contacting load, and said grease lip, a tip of which slidingly contacts the cylindrical portion of the slinger with a predetermined frictional force, the frictional force of the grease lip is equal to or larger than the contacting load of the plurality of side lips in order to avoid the separation of the sealing plate and the slinger.

2. The wheel bearing apparatus of claim 1 wherein the frictional force of the grease lip relative to the cylindrical portion of the slinger is about 12 N and the contacting load of the plurality of side lips relative to the standing plate of the slinger is about 8 N.

3. The wheel bearing apparatus of claim 1 wherein the slinger is formed by press forming an anticorrosion steel sheet.

4. A wheel bearing apparatus comprising:
    an outer member formed with double row outer raceway surfaces on its inner circumferential surface;

an inner member including a wheel hub having an integrally formed wheel mounting flange at one end, an inner raceway surface, and a cylindrical portion axially extending from the wheel mounting flange, at least one inner ring being fit onto the cylindrical portion of the wheel hub, the inner ring being formed with an inner raceway surface on its outer circumferential surface, said inner ring inner raceway surface arranged oppositely to one of the double row outer raceway surfaces;

double row rolling elements rollably arranged between the outer and inner raceway surfaces, via cages;

seals mounted in openings or annular spaces formed between the outer member and the inner member;

at least an inner-side seal of the seals comprises a slinger and an annular sealing plate, each having a substantially "L" shaped cross-section and arranged opposite to one another, the slinger comprises a cylindrical portion with two ends, fit onto the inner member, and a standing plate portion, extending radially outward from one end of the cylindrical portion; the sealing plate comprises a plurality of side lips in sliding contact with the standing plate portion of the slinger with a predetermined interference, and a grease lip, arranged so as not to contact the cylindrical portion of the slinger; and the cylindrical portion of the slinger is formed with a bent portion projecting radially outward from between the two ends of the slinger cylindrical portion, an outer diameter of the bent portion is set larger than an inner diameter of the radially innermost side lip and a tip of the grease lip is projected at a position outer-side of a tip of the bent portion forming a gap between the grease lip and the cylindrical portion.

5. The wheel bearing apparatus of claim 4 wherein a labyrinth seal is formed between the tip of the grease lip and the inner ring and between the grease lip and a tip of the slinger.

6. The wheel bearing apparatus of claim 4 wherein a labyrinth seal is formed between the tip of the grease lip and the cylindrical portion of the slinger and between the grease lip and the bent portion of the slinger.

7. The wheel bearing apparatus of claim 4 wherein the sealing plate comprises a metal core, press fit into the outer member, and a sealing member, integrally vulcanized adhered to the metal core, and the sealing member is formed with a plurality of side lips and a grease lip.

8. The wheel bearing apparatus of claim 4 wherein the slinger is formed by press forming an anticorrosion steel sheet.

* * * * *

UNITED STATES PATENT AND TRADEMARK OFFICE
CERTIFICATE OF CORRECTION

PATENT NO. : 7,942,584 B2
APPLICATION NO. : 11/542560
DATED : May 17, 2011
INVENTOR(S) : Takayuki Norimatsu et al.

It is certified that error appears in the above-identified patent and that said Letters Patent is hereby corrected as shown below:

Column 19
Line 4 "1la" should be --11a--

Signed and Sealed this
Twenty-seventh Day of December, 2011

David J. Kappos
*Director of the United States Patent and Trademark Office*